United States Patent
Elshafie et al.

(10) Patent No.: US 12,127,213 B2
(45) Date of Patent: Oct. 22, 2024

(54) REUSE OF DATA SPS DCI IN EH SPS DCI

(71) Applicant: QUALCOMM Incorporated, San Diego, CA (US)

(72) Inventors: Ahmed Elshafie, San Diego, CA (US); Ahmed Attia Abotabl, San Diego, CA (US); Muhammad Sayed Khairy Abdelghaffar, San Jose, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 17/455,891

(22) Filed: Nov. 19, 2021

(65) Prior Publication Data
US 2023/0164790 A1    May 25, 2023

(51) Int. Cl.
*H04W 72/23*        (2023.01)
*H04L 1/00*         (2006.01)
*H04W 72/0453*      (2023.01)
*H04W 80/02*        (2009.01)

(52) U.S. Cl.
CPC ............ *H04W 72/23* (2023.01); *H04L 1/003* (2013.01); *H04W 72/0453* (2013.01); *H04W 80/02* (2013.01)

(58) Field of Classification Search
CPC . H04W 72/23; H04W 72/0453; H04W 80/02; H04W 72/232; H04W 72/11; H04L 1/003; H04L 1/0025; H04L 1/0075
See application file for complete search history.

(56) References Cited

U.S. PATENT DOCUMENTS

| | | | |
|---|---|---|---|
| 2022/0078779 A1* | 3/2022 | Xu | H04W 72/20 |
| 2022/0078780 A1* | 3/2022 | Choi | H04B 7/0456 |
| 2022/0248432 A1* | 8/2022 | Balasubramanian | H04L 5/0051 |

(Continued)

OTHER PUBLICATIONS

Gbadamosi, Safiu Abiodun, Gerhard P. Hancke, and Adnan M. Abu-Mahfouz. "Building upon NB-IoT networks: A roadmap towards 5G new radio networks." IEEE Access 8 (2020): 188641-188672. (Year: 2020).*

(Continued)

*Primary Examiner* — Sharad Rampuria
(74) *Attorney, Agent, or Firm* — Procopio, Cory, Hargreaves & Savitch LLP

(57) ABSTRACT

Aspects present herein relate to methods and devices for wireless communication including an apparatus, e.g., a UE and/or a base station. The apparatus may receive, from a base station, DCI associated with SPS. The apparatus may also identify whether the DCI is EH SPS activation DCI, EH SPS reactivation DCI, data SPS activation DCI, data SPS reactivation DCI, or SPS release DCI, the EH SPS activation DCI and the EH SPS reactivation DCI corresponding to an EH configuration, the data SPS activation DCI and the data SPS reactivation DCI corresponding to a data processing configuration. Additionally, the apparatus may configure an EH component associated with the EH configuration if the DCI is the EH SPS activation DCI or the EH SPS reactivation DCI, or performing data processing associated with the data processing configuration if the DCI is the data SPS activation DCI or the data SPS reactivation DCI.

28 Claims, 15 Drawing Sheets

(56) References Cited

U.S. PATENT DOCUMENTS

2022/0338122 A1* 10/2022 Elshafie ................ H04W 52/36

OTHER PUBLICATIONS

Gerami, Majid, and Bikramjit Singh. "Configured grant for ultra-reliable and low-latency communications: Standardization and beyond." IEEE Communications Standards Magazine 6.4 (2022): 40-47. (Year: 2022).*

* cited by examiner

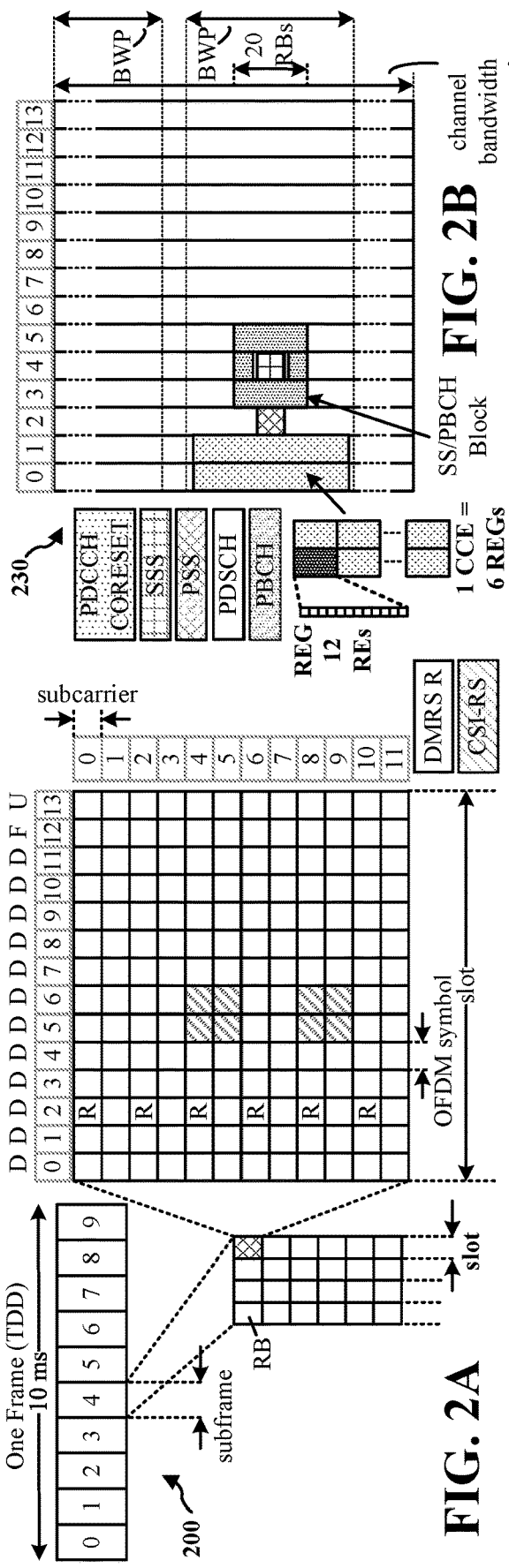
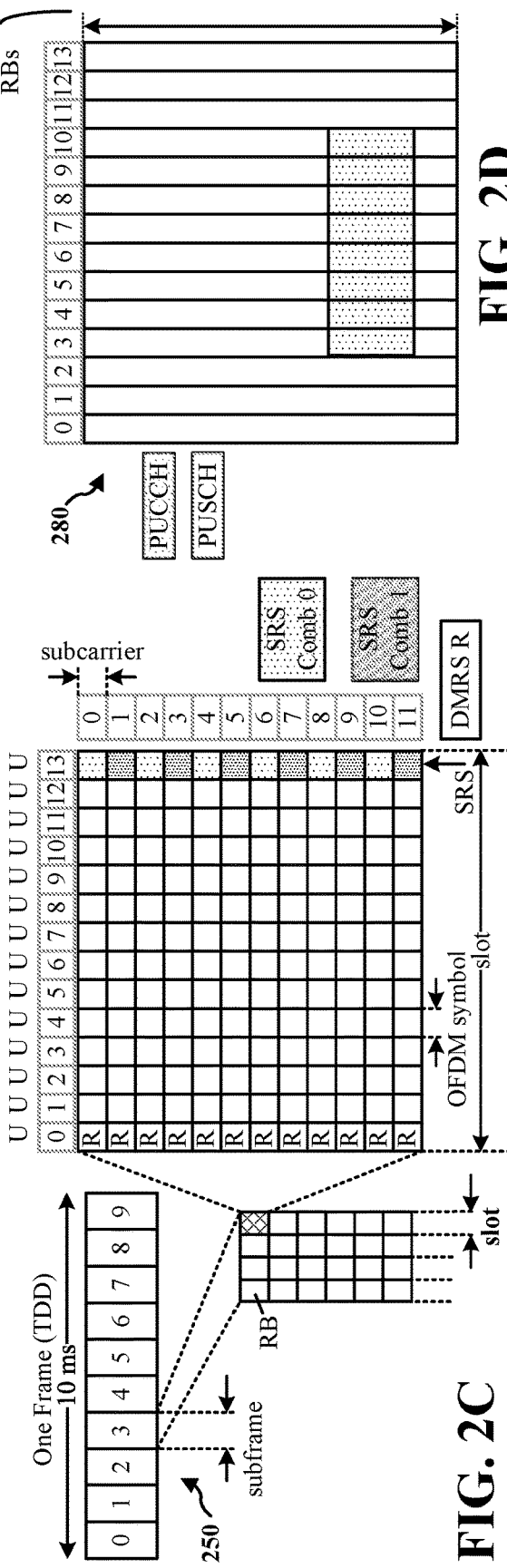

REUSE OF DATA SPS DCI IN EH SPS DCI

TECHNICAL FIELD

The present disclosure relates generally to communication systems, and more particularly, to semi-persistent scheduling (SPS) and energy harvesting (EH) in wireless communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive, from a base station, a configuration of an energy harvesting (EH) component via a radio resource control (RRC) message or a medium access control (MAC) control element (MAC-CE). The apparatus may also receive, from a base station, downlink control information (DCI) associated with semi-persistent scheduling (SPS). Additionally, the apparatus may identify whether the DCI is energy harvesting (EH) SPS activation DCI, EH SPS reactivation DCI, data SPS activation DCI, data SPS reactivation DCI, or SPS release DCI, the EH SPS activation DCI and the EH SPS reactivation DCI corresponding to an EH configuration, the data SPS activation DCI and the data SPS reactivation DCI corresponding to a data processing configuration. The apparatus may also configure an EH component associated with the EH configuration if the DCI is the EH SPS activation DCI or the EH SPS reactivation DCI, or performing data processing associated with the data processing configuration if the DCI is the data SPS activation DCI or the data SPS reactivation DCI. Further, the apparatus may perform energy harvesting via the EH component if the EH component is configured. The apparatus may also adjust a component path associated with energy harvesting if the EH component is configured, where the component path corresponds to at least one of: a number of antennas, a number of analog filters, a number of beams, or a number of ports.

In another aspect of the disclosure, a method, a computer-readable medium, and an apparatus are provided. The apparatus may be a base station. The apparatus may identify whether a transmission with a user equipment (UE) is associated with an energy harvesting (EH) configuration or a data processing configuration. The apparatus may also transmit, to the UE, a configuration of an EH component via a radio resource control (RRC) message or a medium access control (MAC) control element (MAC-CE). Moreover, the apparatus may transmit, to the UE, downlink control information (DCI) associated with semi-persistent scheduling (SPS), the DCI being EH SPS activation DCI, EH SPS reactivation DCI, data SPS activation DCI, data SPS reactivation DCI, or SPS release DCI, the EH SPS activation DCI and the EH SPS reactivation DCI corresponding to the EH configuration, the data SPS activation DCI and the data SPS reactivation DCI corresponding to the data processing configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
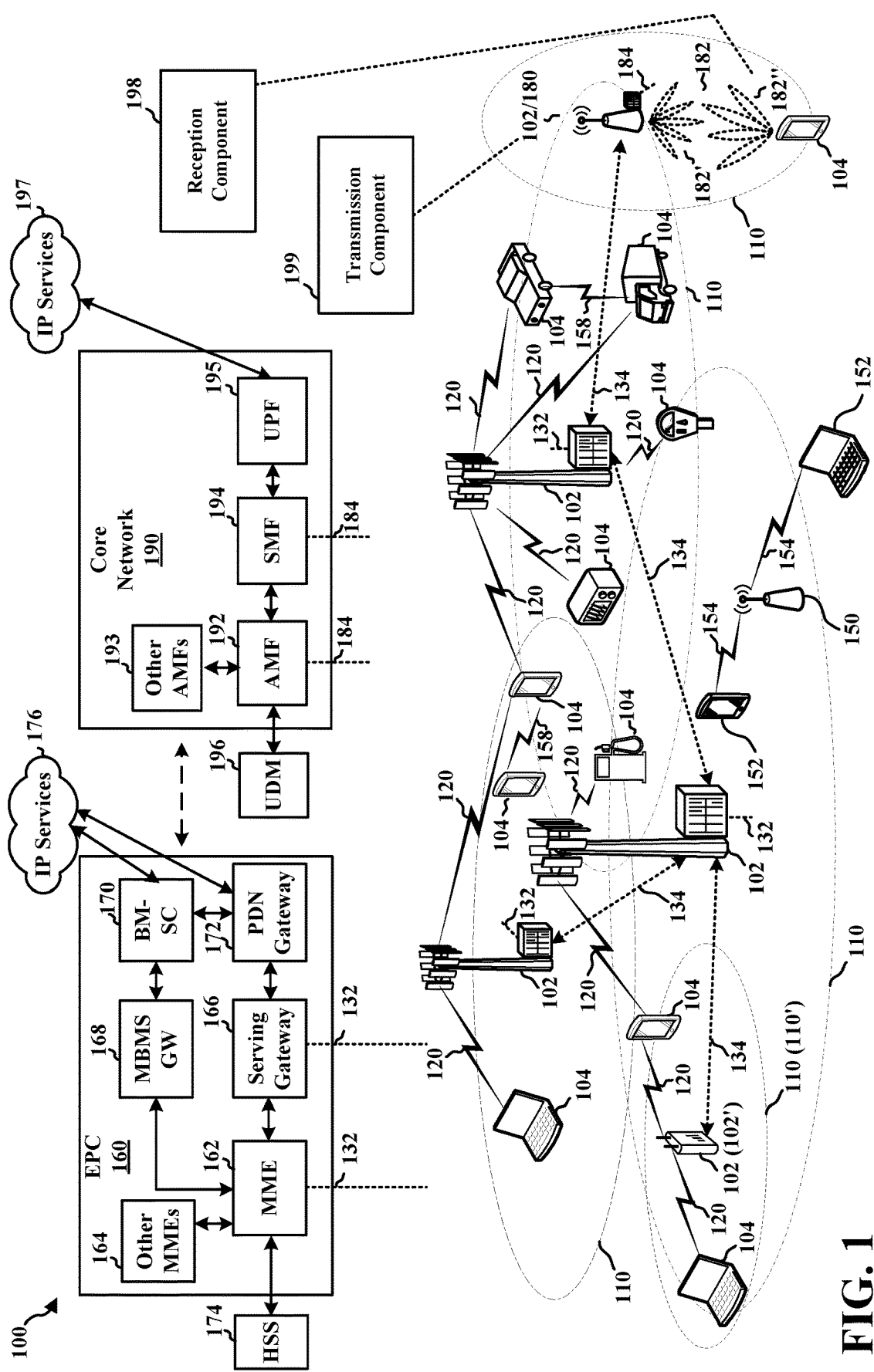
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a reception component 198 configured to receive, from a base station, a configuration of an energy harvesting (EH) component via a radio resource control (RRC) message or a medium access control (MAC) control element (MAC-CE). Reception component 198 may also be configured to receive, from a base station, downlink control information (DCI) associated with semi-persistent scheduling (SPS). Reception component 198 may also be configured to identify whether the DCI is energy harvesting (EH) SPS activation DCI, EH SPS reactivation DCI, data SPS activation DCI, data SPS reactivation DCI, or SPS release DCI, the EH SPS activation DCI and the EH SPS reactivation DCI corresponding to an EH configuration, the data SPS activation DCI and the data SPS reactivation DCI corresponding to a data processing configuration. Reception component 198 may also be configured to configure an EH component associated with the EH configuration if the DCI is the EH SPS activation DCI or the EH SPS reactivation DCI, or performing data processing associated with the data processing configuration if the DCI is the data SPS activation DCI or the data SPS reactivation DCI. Reception component 198 may also be configured to perform energy harvesting via the EH component if the EH component is configured. Reception component 198 may also be configured to adjust a component path associated with energy harvesting if the EH component is configured, where the component path corresponds to at least one of: a number of antennas, a number of analog filters, a number of beams, or a number of ports.

Referring again to FIG. 1, in certain aspects, the base station 180 may include a transmission component 199 configured to identify whether a transmission with a user equipment (UE) is associated with an energy harvesting (EH) configuration or a data processing configuration. Transmission component 199 may also be configured to transmit, to the UE, a configuration of an EH component via a radio resource control (RRC) message or a medium access control (MAC) control element (MAC-CE). Transmission component 199 may also be configured to transmit, to the UE, downlink control information (DCI) associated with semi-persistent scheduling (SPS), the DCI being EH SPS activation DCI, EH SPS reactivation DCI, data SPS activation DCI, data SPS reactivation DCI, or SPS release DCI, the EH SPS activation DCI and the EH SPS reactivation DCI corresponding to the EH configuration, the data SPS activation DCI and the data SPS reactivation DCI corresponding to the data processing configuration.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
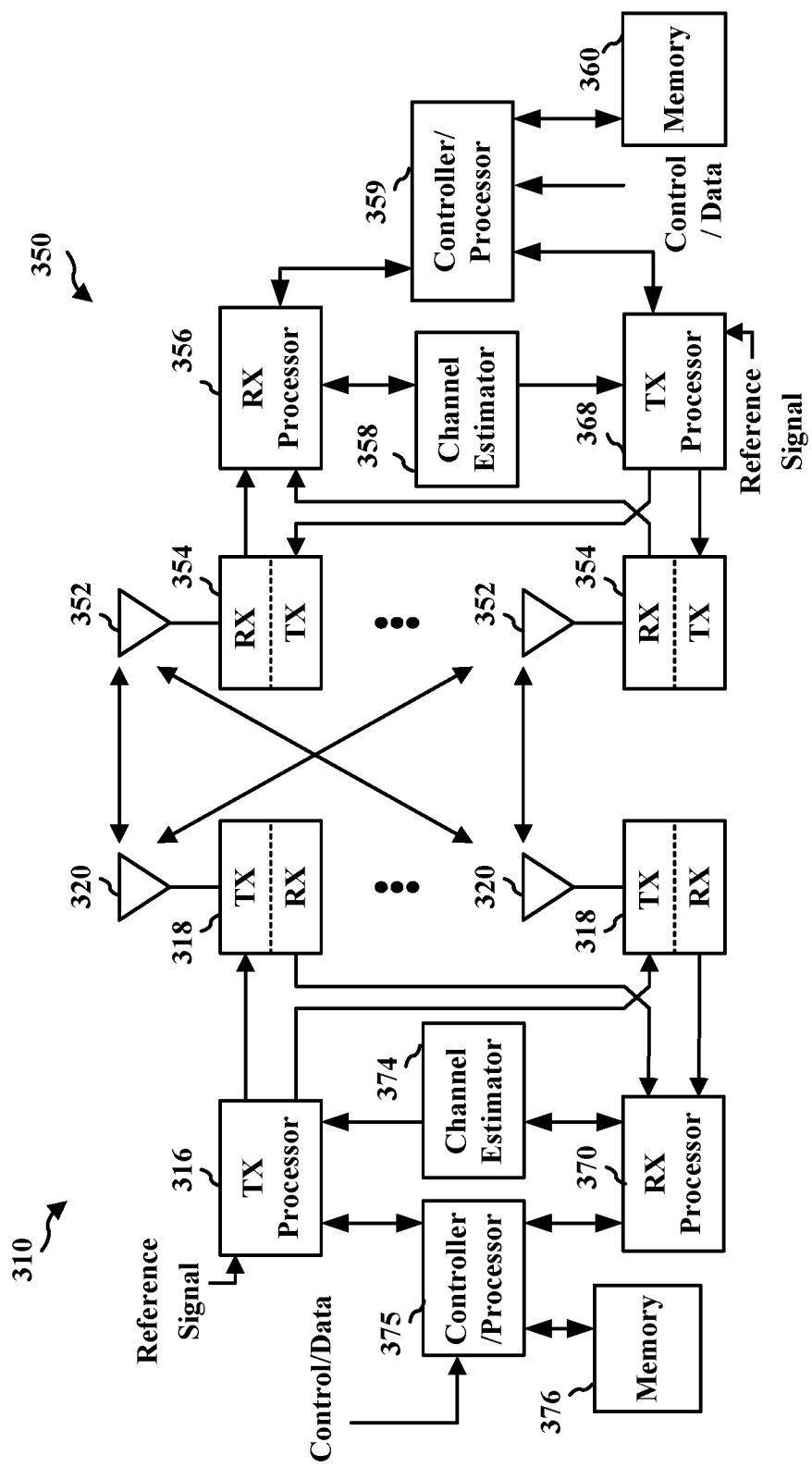
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX.

Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Some aspects of wireless communication, e.g., LTE or NR, may utilize energy harvesting, i.e., the process by which energy is derived from external sources (e.g., wind, solar, vibrations, etc.) or other sources. In energy harvesting (EH), the harvested energy may be captured and stored for wireless autonomous devices, such as UEs or devices used in wearable electronics and wireless sensor networks. Energy harvesting sources may also provide a small amount of power for low-energy electronics. Additionally, different types of wireless communications may utilize different types of energy harvesting, e.g., wireless radio frequency (RF) energy harvesting. In RF energy harvesting, RF sources may provide a controllable and constant energy transfer over a distance for RF energy harvesters. In a fixed RF energy harvesting network, the harvested energy may be predictable and relatively stable over time due to a fixed distance.

One purpose of harvesting RF energy is to be utilized in tasks such as data decoding, data reception, data encoding, and/or data transmission. In some aspects, while the purpose may not be to fully charge a battery of a device, energy harvesting may charge the battery of a device (e.g., wearable, smart watch, UE, low power device, etc.), or use some dedicated battery for energy harvesting, in a way that some tasks may be performed using the harvested energy. For example, tasks such as data decoding, data encoding, operating some filters, transmitting/receiving data may be performed through the accumulation of energy over time. This process is known as a self-sustainable network, where a node in the network may interact in the network via the energy harvested in the network through transmissions.

In RF energy harvesting, the harvested energy may be represented by a number of different formulas. For instance, using a random multipath fading channel model, the energy harvested at node j from a transmitting node i may be provided by: $E_j = \eta P_i |g_{i-j}|^2 T$, where $P_i$ is the transmit power of node i, $g_{i-j}$ is the channel coefficient of the link between node i and node j, T is the time allocated for energy harvesting, and η is the RF-to-direct current (DC) conversion efficiency.

Figure 4:
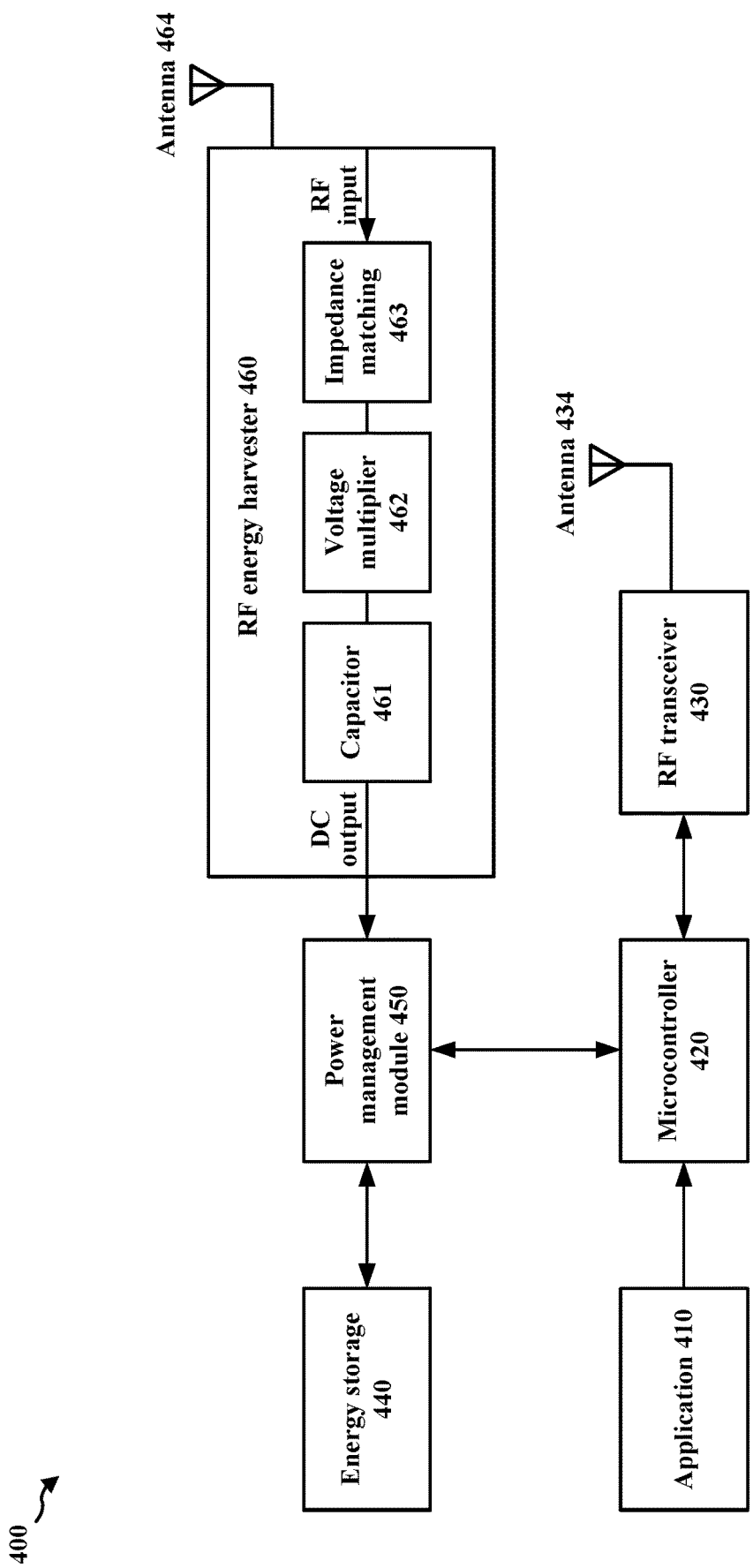
FIG. 4 is a diagram illustrating an example node for radio frequency (RF) energy harvesting.

FIG. 4 is a diagram 400 illustrating an example node for RF energy harvesting. As shown in FIG. 4, the RF energy harvesting node includes application 410, microcontroller 420, RF transceiver 430, energy storage component 440, power management module 450, antenna 434, antenna 464, and RF energy harvester 460 including capacitor 461, voltage multiplier 462, and impedance matching component 463. More specifically, diagram 400 depicts the major components in an RF energy harvesting node. Each of the components in FIG. 4 has a specific function for the RF energy harvesting node. For instance, the microcontroller 420, e.g., a low-power microcontroller, may be utilized to process data from application 410. The RF transceiver 430, e.g., a low-power RF transceiver, may be utilized for information transmission or reception. Also, the energy storage component 440, e.g., a battery, may store energy. The power management module 450 may determine whether to store electricity obtained from the RF energy harvester 460 or to use the energy for information transmission immediately. Further, the RF energy harvester 460 may to collect RF signals and convert them into electricity. RF energy harvester 460 may include an RF antenna 464, impedance matching component 463, voltage multiplier 462, and capacitor 461.

Additionally, there may be a number of different types of RF energy harvesting techniques or schemes. For instance, some examples of RF energy harvesting schemes are: separated receiver architecture, time-switching architecture, and power-splitting architecture.

Figure 5A:
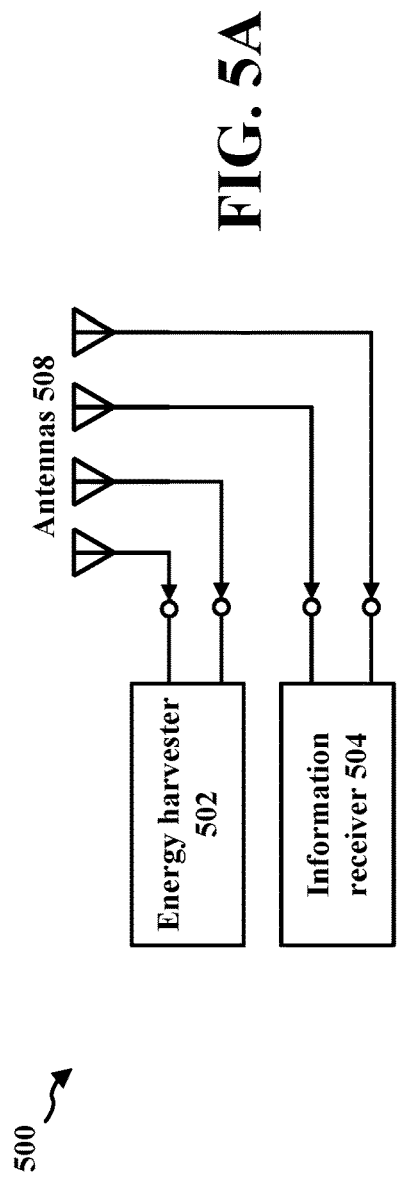
FIG. 5A is a diagram illustrating an example RF energy harvesting scheme.
Figure 5C:
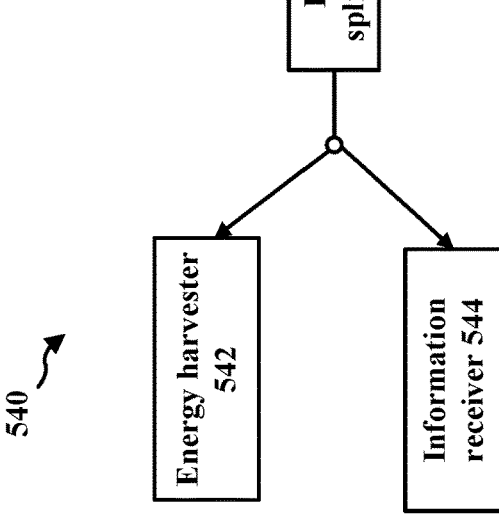
FIG. 5C is a diagram illustrating an example RF energy harvesting scheme.
Figure 5B:
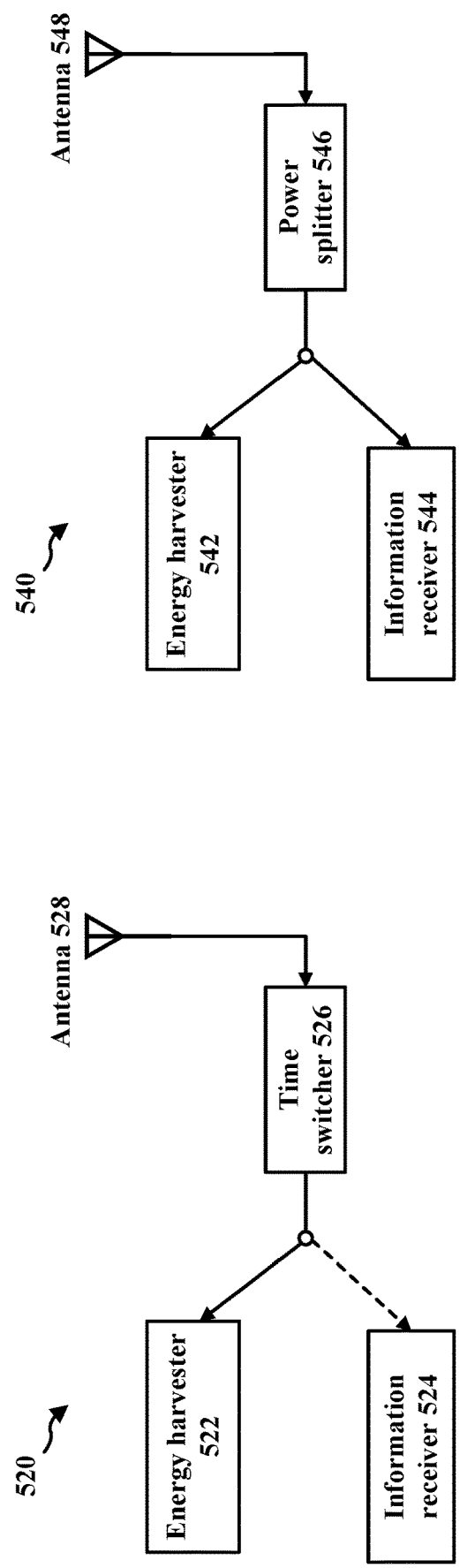
FIG. 5B is a diagram illustrating an example RF energy harvesting scheme.

FIGS. 5A, 5B, and 5C are diagrams 500, 520, and 540 respectively, illustrating examples of RF energy harvesting schemes. As shown in FIGS. 5A, 5B, and 5C, some examples of RF energy harvesting techniques or schemes are: separated receiver architecture, time-switching architecture, and power-splitting architecture. FIG. 5A depicts diagram 500 of a separated receiver architecture including an energy harvester 502, an information receiver 504, and antennas 508. As shown in FIG. 5A, the energy harvester 502 and the information receiver 504 are separated. FIG. 5B illustrates diagram 520 of a time-switching architecture including energy harvester 522, information receiver 524, time switcher 526, and antenna 528. FIG. 5C shows diagram 540 of a power-splitting architecture including energy harvester 542, information receiver 544, power splitter 546, and antenna 548.

As shown in FIG. 5B, a time-switching architecture may allow a network node to switch between an information receiver 524 or an RF energy harvester 522. In a time-switching architecture, the energy harvested at receiver j from source i may be calculated as follows: $E_j=\eta P_i|g_{i-j}|^2 \alpha T$, where $0 \leq \alpha \leq 1$ is the fraction of time allocated for energy harvesting. Also, letting K and W denote the noise spectral density and channel bandwidth, the data rate may be given by:

$$R_{i-j} = (1-\alpha)\log_2\left(1 + \frac{|g_{i-j}|^2 P_i}{\kappa W}\right).$$

As shown in FIG. 5C, in a power-splitting architecture, the received RF signals may be split into two streams for an information receiver 544 and an RF energy harvester 542 with different power levels. The energy harvested at receiver j from source i may be calculated as: $E_j=\eta \rho P_i|g_{i-j}|^2 T$, where $0 \leq \rho \leq 1$ is the fraction of power allocated for energy harvesting. The data rate may be given by:

$$R_{i-j} = \log_2\left(1 + \frac{|g_{i-j}|^2 (1-\rho) P_i}{\kappa W}\right).$$

Some aspects of wireless communications may include semi-persistent scheduling (SPS) and associated downlink control information (DCI). In some SPS configurations, RRC signaling may configure the SPS periodicity and/or hybrid automatic repeat request (HARQ) acknowledgement (ACK) (HARQ-ACK) feedback resources. The DCI associated with SPS may include SPS activation DCI, SPS reactivation DCI, and SPS release DCI. In some instances, the base station may use SPS activation DCI to activate a certain configured SPS. In the activation DCI, the base station may indicate transmit (Tx) parameters, such as modulation and coding scheme (MCS), resource block (RB) allocation, and/or antenna ports of the SPS transmission. The base station may also use SPS reactivation DCI to change the Tx parameters such as MCS, RB allocation, and/or antenna ports of the SPS. Further, the base station may use SPS release DCI to deactivate a configured SPS.

Figure 6:
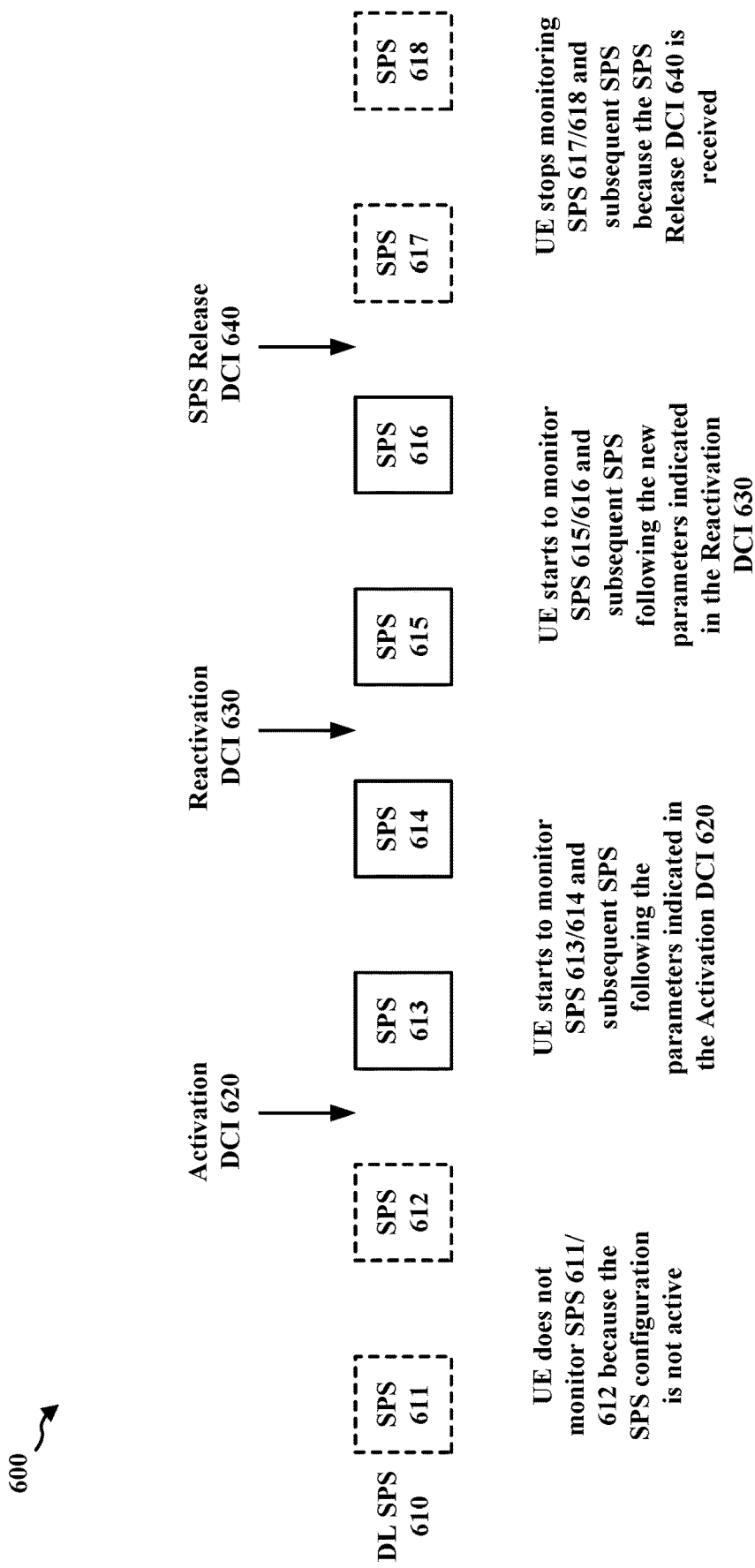
FIG. 6 is a diagram illustrating example SPS and corresponding DCI.

FIG. 6 is a diagram 600 illustrating an example SPS and corresponding DCI. As shown in FIG. 6, diagram 600 includes downlink (DL) SPS 610 including SPS 611-618. In addition to SPS 611-618, FIG. 6 also illustrates several types of corresponding DCI including activation DCI 620, reactivation DCI 630, and SPS release DCI 640. As shown in FIG. 6, a UE may not monitor SPS 611/612 because the SPS configuration is not active yet. Once activation DCI 620 is received, a UE may start to monitor SPS 613/614 and any subsequent SPS following the parameters indicated in the activation DCI 620. Also, once reactivation DCI 630 is received, a UE may start to monitor SPS 615/616 and any subsequent SPS following the new parameters indicated in the reactivation DCI 630. Further, once SPS release DCI 640 is received, a UE may stop monitoring SPS 617/618 and any subsequent SPS because of the SPS release DCI 640.

Aspects of wireless communication may also include SPS related DCI validation. In some instances, after a UE detects DCI, the UE may determine that the DCI is for SPS activation/reactivation, SPS release, or other DCI to dynamically schedule a PDSCH. For instance, the procedure the UE follows to validate DCI may be: (1) verify the DCI is for SPS, and (2) the UE may distinguish that the SPS related DCI is for SPS activation/reactivation or SPS release. In step 1, a UE may validate that DCI is for SPS purposes for a number of reasons. For example, the UE may validate that DCI is for SPS if the cyclic redundancy check (CRC) of a corresponding DCI format is scrambled with a configured scheduling radio network temporary identifier (CS-RNTI) (e.g., provided by cs-RNTI). The UE may also verify that DCI is for SPS if the new data indicator field in the DCI format for the enabled transport block is set to '0'. Also, the UE may verify that DCI is for SPS if the downlink feedback information (DFI) flag field in the DCI format is set to '0'. Moreover, the UE may validate that DCI is for SPS if validation is for scheduling activation and if a PDSCH-to-HARQ_feedback timing indicator field in the DCI format is present, and/or if the PDSCH-to-HARQ_feedback timing indicator field does not provide an inapplicable value from a DL data-to-UL ACK (dl-DataToUL-ACK).

As indicated above, UEs may also distinguish between DCI for SPS activation/reactivation and DCI for SPS release. For SPS activation/reactivation DCI, UEs may set all of the redundancy version (RV) values to be equal to '0'. For SPS release DCI, UEs may set all of the redundancy version (RV) values to be equal to '0'. Also, for SPS release DCI, UEs may set all of the modulation and coding scheme (MCS) values to be equal to '1'. Further, for SPS release DCI, UEs may use invalid frequency domain resource allocation (FDRA) values, i.e., set all FDRA values to be equal to '0' for FDRA Type 0 or for a dynamic switch (dynamicSwitch). For SPS release DCI, UEs may also set all FDRA values to be equal to '1' for FDRA Type 1. Table 1 and Table 2 below indicate the corresponding values for SPS activation/reactivation DCI and SPS release DCI.

TABLE 1

| SPS activation/reactivation | |
|---|---|
| Redundancy version | Set to all '0's |

TABLE 2

| SPS release | |
|---|---|
| Redundancy version | Set to all '0's |
| Modulation and coding scheme | Set to all '1's |
| Frequency domain resource assignment | Set to all '0's for FDRA Type 0 or for dynamicSwitch |
| | Set to all '1's for FDRA Type 1 |

Certain types of SPS, e.g., data SPS, may be used to allow for service of voice-over-Internet protocol (VoIP) and periodic transmissions. Also, with a single activation DCI, a series of PDSCHs or PUSCHs may be triggered and used to serve a UE. In some instances, different configurations for energy harvesting (EH) resource allocation may be utilized, including the SPS case. Additionally, as EH may utilize SPS DCI, it may be beneficial to specify an EH SPS DCI (e.g., for SPS activation/reactivation/release DCI). For instance, rather than using a new DCI, it may be beneficial to reuse the data SPS DCI. Accordingly, it may be beneficial to utilize methods to reuse the data SPS DCI in EH SPS DCI.

Aspects of the present disclosure may allow SPS DCI to be utilized for energy harvesting. For instance, aspects of the present disclosure may allow for different types of SPS DCI, e.g., SPS activation DCI, SPS reactivation DCI, and SPS release DCI, to be used with energy harvesting. Additionally, in some instances, aspects of the present disclosure may reuse data SPS DCI. More specifically, aspects of the present disclosure may allow for the reuse of data SPS DCI in energy harvesting (EH) SPS DCI.

Aspects of the present disclosure may also include procedures for newly introduced SPS DCI types (e.g., SPS cancellation DCI). For instance, aspects of the present disclosure may receive DCI and/or validate that the DCI is SPS related DCI. Further, aspects of the present disclosure may distinguish between data SPS DCI and energy harvesting (EH) SPS DCI. For both data SPS DCI and EH SPS DCI, there may be SPS activation DCI, SPS reactivation DCI, and SPS release DCI. Accordingly, aspects of the present disclosure may determine whether DCI is EH SPS activation DCI, EH SPS reactivation DCI, data SPS activation DCI, data SPS reactivation DCI, or SPS release DCI.

Figure 7:
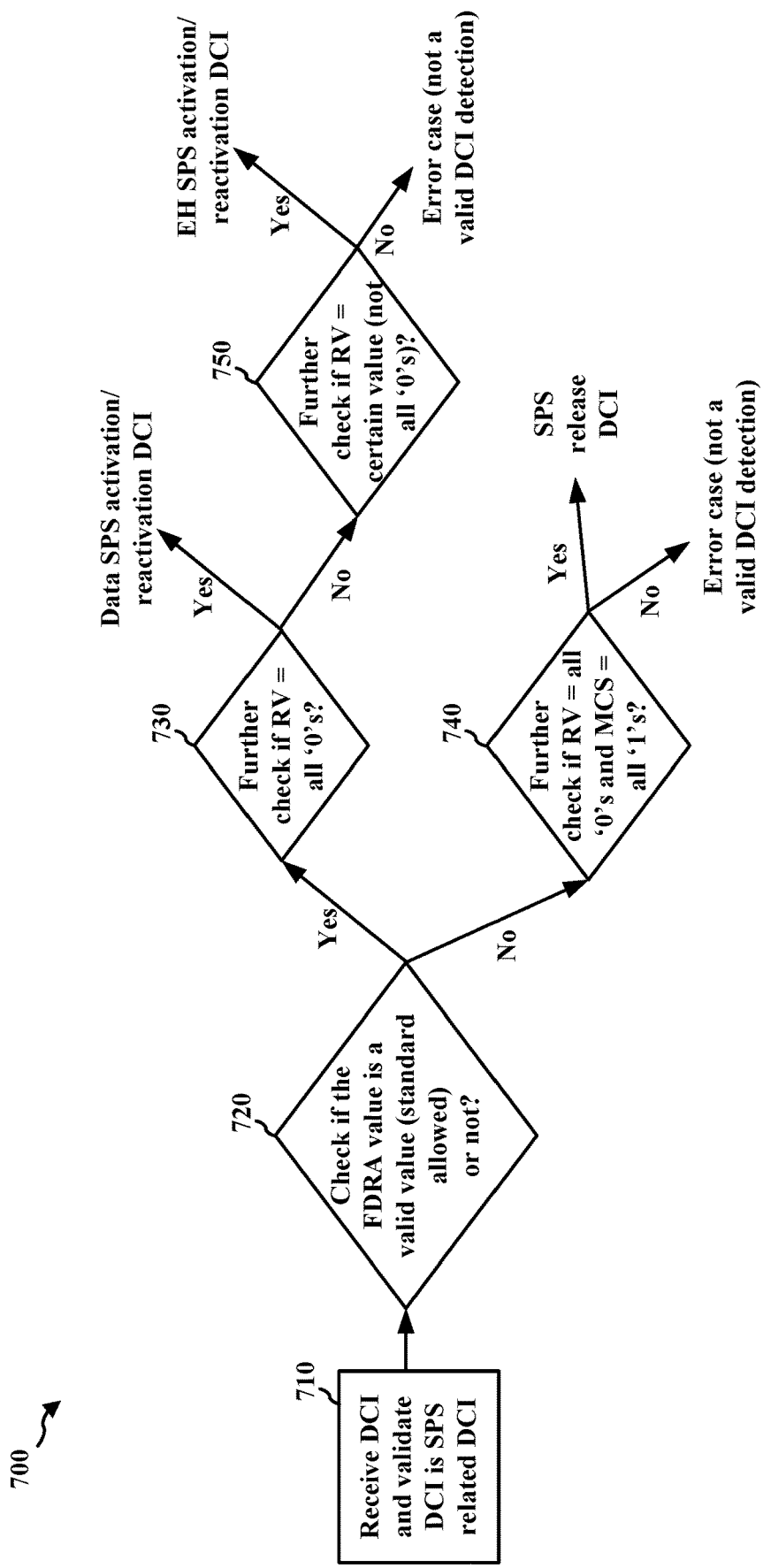
FIG. 7 is a diagram illustrating an example DCI identification procedure.
Figure 8:
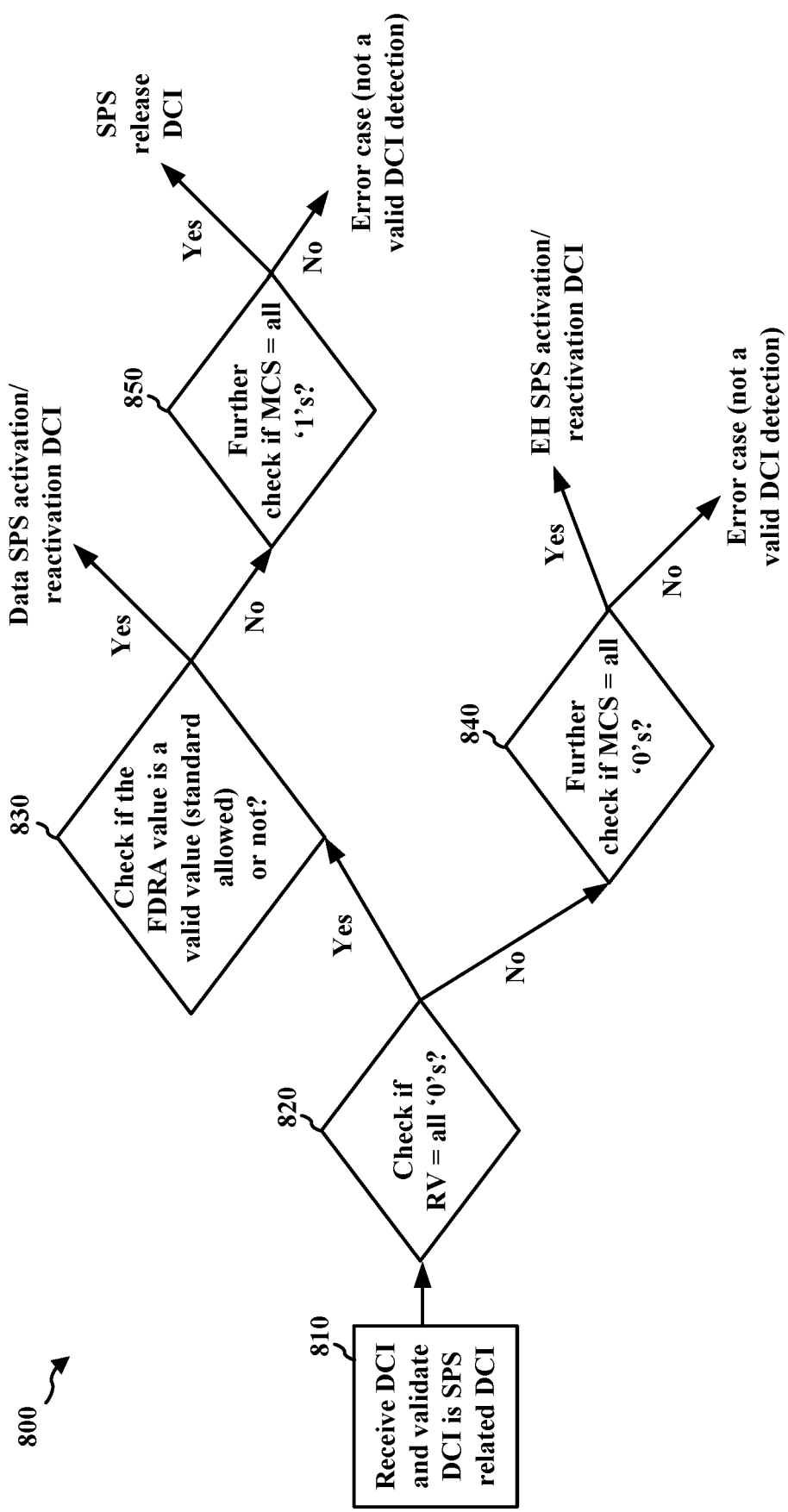
FIG. 8 is a diagram illustrating an example DCI identification procedure.
Figure 9:
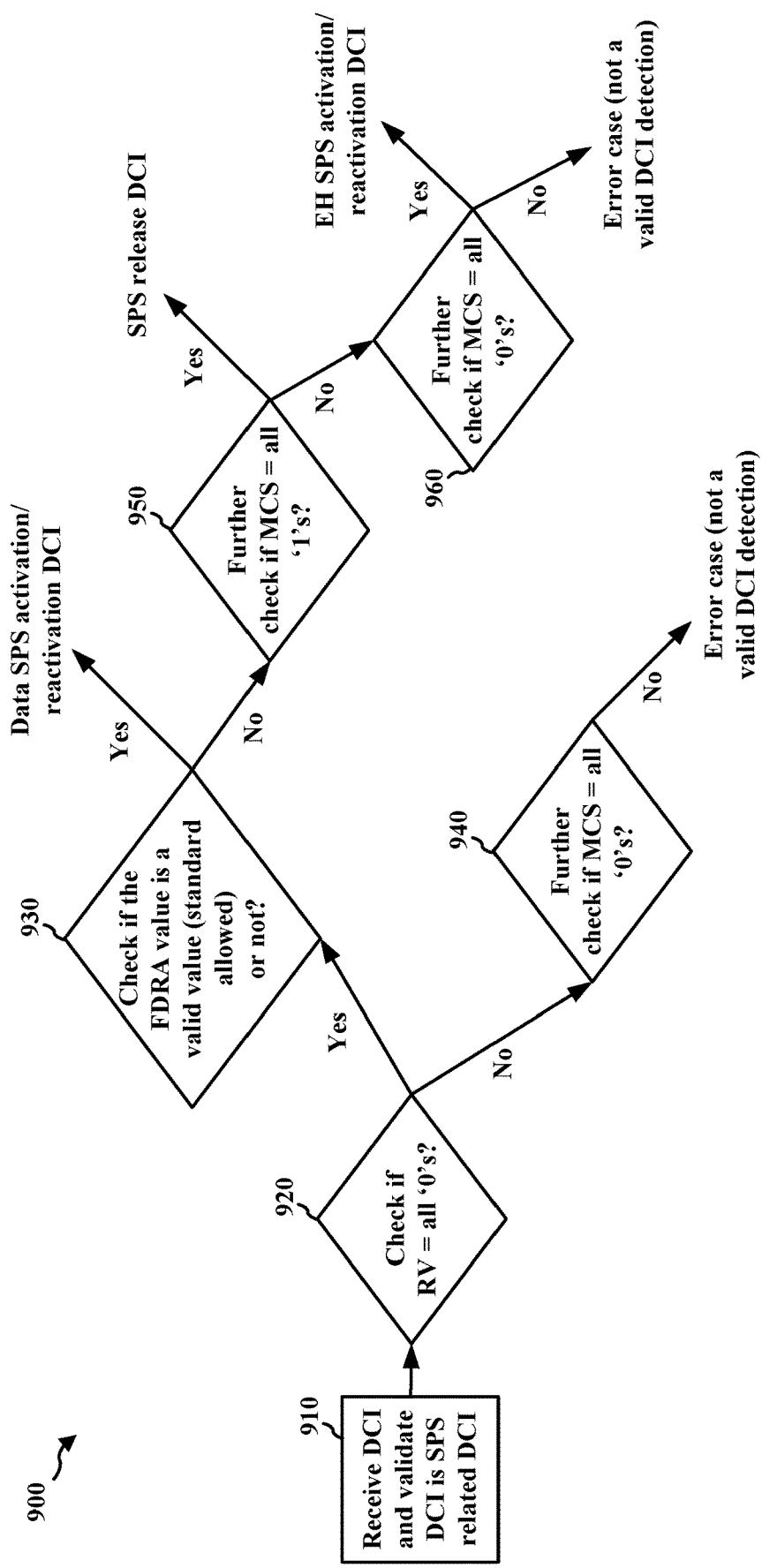
FIG. 9 is a diagram illustrating an example DCI identification procedure.

In order to distinguish between data SPS DCI and energy harvesting (EH) SPS DCI, aspects of the present disclosure may utilize a number of different procedures. For instance, after receiving DCI and verifying that the DCI is SPS related DCI, aspects of the present disclosure may identify whether the DCI is EH SPS activation/reactivation DCI, data SPS activation/reactivation DCI, or SPS release DCI. Also, to identify the type of SPS activation/reactivation/release DCI, aspects of the present disclosure may perform different DCI identification techniques or procedures. FIGS. 7-9 display examples of these types of DCI identification procedures.

FIG. 7 is a diagram 700 illustrating an example DCI identification procedure. As shown in FIG. 7, at 710, aspects of the present disclosure may receive DCI and validate/verify the DCI is SPS related DCI. At 720, aspects of the present disclosure may determine/check if the frequency domain resource allocation (FDRA) value of the DCI is a valid value (i.e., a standard allowed value) or not. If the FDRA value is valid, at 730, aspects of the present disclosure may further determine/check if all redundancy version (RV) values in the DCI are equal to '0'. If all RV values are equal to '0', the DCI may be data SPS activation/reactivation DCI. If not all RV values are equal to '0', at 750, aspects of the present disclosure may further check if the RV values in the DCI are equal to a certain value (e.g., not all '0's). If the RV values are a certain value, the DCI may be EH SPS activation/reactivation DCI. If the RV values are not a certain value, there may be an error case, such that the DCI detection is not valid.

As shown at 740 in FIG. 7, if the FDRA value of the DCI is not valid, aspects of the present disclosure may further check if all RV values in the DCI are equal to '0' and check if all MCS values are equal to '1'. If all RV values in the DCI are equal to '0' and all MCS values are equal to '1', the DCI may be SPS release DCI. Accordingly, a UE may stop monitoring for SPS DCI. If not all RV values in the DCI are equal to '0' or not all MCS values are equal to '1', there may be an error case, such that the DCI detection is not valid. As such, the DCI detection process may start over.

As depicted in FIG. 7, UEs may validate or verify that DCI is SPS activation/reactivation/release DCI. Aspects presented herein may validate/verify that DCI is EH DCI based on a number of reasons. For example, DCI may be verified as EH DCI if an FDRA value is set to a valid specification value. Further, DCI may be verified as EH DCI if RV values are set to less than all '0's. DCI may also be verified as EH DCI if MCS values are set to a special value which is other than all 1's (e.g., all '0's). For instance, as EH does not use MCS, DCI may be verified as EH DCI if MCS values are not all '1's.

As indicated in FIG. 7, for SPS cancellation DCI, UEs may set all of the redundancy version (RV) values to be equal to '1'. Also, for SPS cancellation DCI, UEs may set all of the modulation and coding scheme (MCS) values to be equal to '0'. Further, for SPS cancellation DCI, UEs may use invalid frequency domain resource allocation (FDRA) values, i.e., set all FDRA values to be equal to '0' for FDRA Type 0 or for a dynamic switch (dynamicSwitch). For SPS cancellation DCI, UEs may also set all FDRA values to be equal to '1' for FDRA Type 1.

FIG. 8 is a diagram 800 illustrating an example DCI identification procedure. As shown in FIG. 8, at 810, aspects of the present disclosure may receive DCI and validate/verify the DCI is SPS related DCI. At 820, aspects of the present disclosure may determine/check if all redundancy version (RV) values in the DCI are equal to '0'. If all RV values are equal to '0', at 830, aspects of the present disclosure may further check if the frequency domain resource allocation (FDRA) value of the DCI is a valid value (i.e., a standard allowed value) or not. If the FDRA is a valid value, the DCI may be data SPS activation/reactivation DCI. If the FDRA is not a valid value, at 850, aspects of the present disclosure may further check if all MCS values are equal to '1'. If all MCS values are equal to '1', the DCI may be SPS release DCI. Accordingly, a UE may stop monitoring for SPS DCI. If not all MCS values are equal to '1', there may be an error case, such that the DCI detection is not valid.

As shown at 840 in FIG. 8, if not all RV values are equal to '0', aspects of the present disclosure may further check if all MCS values are equal to '0'. If all MCS values are equal to '0', the DCI may be EH SPS activation/reactivation DCI. If not all MCS values are equal to '0', there may be an error case, such that the DCI detection is not valid. As such, the DCI detection process may start over.

As depicted in FIG. 8, UEs may validate or verify that DCI is SPS activation/reactivation/release DCI. Aspects presented herein may validate/verify that DCI is EH DCI based on a number of reasons. For example, DCI may be verified as EH DCI if RV values are set to a special value that is other than all '0's (e.g., all '1's). Further, DCI may be verified as EH DCI if MCS values are set to a special value which is other than all '1's (e.g., all '0's). For instance, as EH does not use MCS, DCI may be verified as EH DCI if MCS values are not all '1's. As further indicated in FIG. 8, for SPS cancellation DCI, UEs may set all of the redundancy version (RV) values to be equal to '1'. Also, for SPS cancellation DCI, UEs may set all of the modulation and coding scheme (MCS) values to be equal to '0'.

FIG. 9 is a diagram 900 illustrating an example DCI identification procedure. As shown in FIG. 9, at 910, aspects of the present disclosure may receive DCI and validate/verify the DCI is SPS related DCI. At 920, aspects of the present disclosure may determine/check if all redundancy version (RV) values in the DCI are equal to '0'. If all RV values are equal to '0', at 930, aspects of the present disclosure may further check if the frequency domain resource allocation (FDRA) value of the DCI is a valid value (i.e., a standard allowed value) or not. If the FDRA is a valid value, the DCI may be data SPS activation/reactivation DCI. If the FDRA is not a valid value, at 950, aspects of the present disclosure may further check if all MCS values are equal to '1'. If all MCS values are equal to '1', the DCI may be SPS release DCI. Accordingly, a UE may stop monitoring for SPS DCI.

As shown at 960 in FIG. 9, if not all MCS values are equal to '1', aspects of the present disclosure may further check all MCS values are equal to '0'. If all MCS values are equal to '0', the DCI may be EH SPS activation/reactivation DCI. If not all MCS values are equal to '0', there may be an error case, such that the DCI detection is not valid. As shown at 940 in FIG. 9, if not all RV values are equal to '0', aspects of the present disclosure may further check if all MCS values are equal to '0'. If not all MCS values are equal to '0', there may be an error case, such that the DCI detection is not valid. As such, the DCI detection process may start over.

As depicted in FIG. 9, UEs may validate or verify that DCI is SPS activation/reactivation/release DCI. Aspects presented herein may validate/verify that DCI is EH DCI based on a number of reasons. For example, DCI may be verified as EH DCI if all RV values are equal to '0'. Further, DCI may be verified as EH DCI if MCS values are set to a special value which is other than all '1's (e.g., all '0's). For instance, as EH does not use MCS, DCI may be verified as EH DCI if MCS values are not all 1's. As further indicated in FIG. 9, for SPS cancellation DCI, UEs may set all of the redundancy version (RV) values to be equal to '1'. Also, for SPS cancellation DCI, UEs may set all of the modulation and coding scheme (MCS) values to be equal to '0'.

Aspects of the present disclosure may include a number of benefits or advantages. For instance, aspects of the present disclosure may distinguish between data SPS DCI and energy harvesting SPS DCI. Accordingly, aspects of the present disclosure may allow UEs to reuse data SPS DCI in EH SPS DCI. As such, by distinguishing between data SPS DCI and energy harvesting SPS DCI, aspects presented herein may allow UEs to save power and/or function more efficiently.

Figure 10:
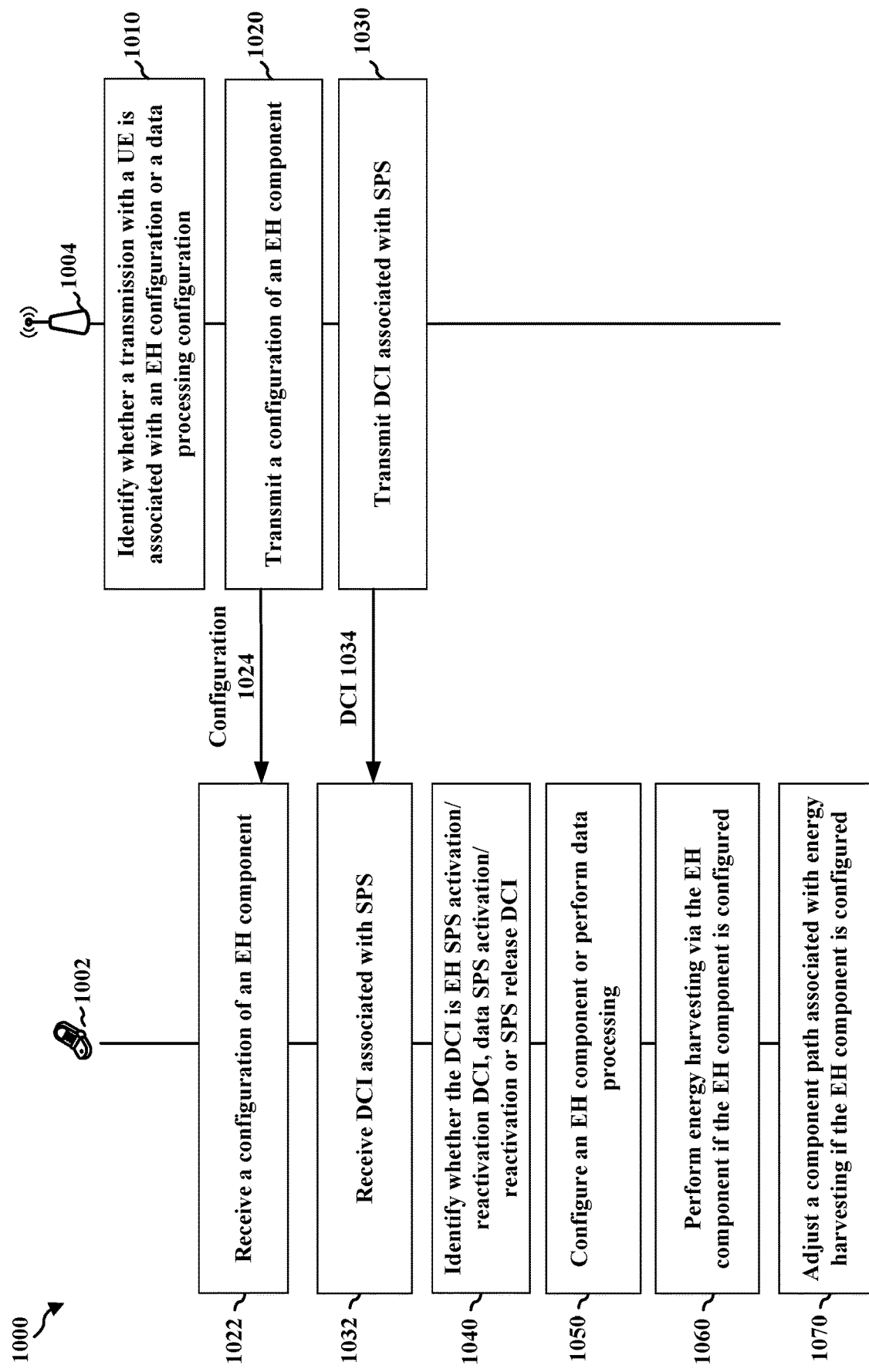
FIG. 10 is a diagram illustrating example communication between a UE and a base station.

FIG. 10 is a diagram 1000 illustrating example communication between a UE 1002 and a base station 1004.

At 1010, base station 1004 may identify whether a transmission with a user equipment (UE) (e.g., UE 1002) is associated with an energy harvesting (EH) configuration or a data processing configuration.

At 1020, base station 1004 may transmit, to the UE (e.g., UE 1002), a configuration of an EH component (e.g., configuration 1024) via a radio resource control (RRC) message or a medium access control (MAC) control element (MAC-CE).

At 1022, UE 1002 may receive, from a base station (e.g., base station 1004), a configuration of an energy harvesting (EH) component (e.g., configuration 1024) via a radio resource control (RRC) message or a medium access control (MAC) control element (MAC-CE). In some instances, a configuration of the EH component may be preconfigured or pre-specified in a specification. Also, the EH component may be an EH circuit including at least one of a full switch, a partial switch, an EH filter, or an EH combiner.

At 1030, base station 1004 may transmit, to the UE (e.g., UE 1002), downlink control information (DCI) associated with semi-persistent scheduling (SPS) (e.g., DCI 1034), the DCI being EH SPS activation DCI, EH SPS reactivation DCI, data SPS activation DCI, data SPS reactivation DCI, or SPS release DCI, the EH SPS activation DCI and the EH SPS reactivation DCI corresponding to the EH configuration, the data SPS activation DCI and the data SPS reactivation DCI corresponding to the data processing configuration.

At 1032, UE 1002 may receive, from a base station (e.g., base station 1004), downlink control information (DCI) associated with semi-persistent scheduling (SPS) (e.g., DCI 1034). The DCI may include at least one of a redundancy version (RV) index, a number of ports for energy harvesting, or a modulation and coding scheme (MCS) index. The RV index and/or the MCS index may correspond to one or more EH configuration parameters or a configuration of the EH component. The one or more EH configuration parameters may include a power splitting factor if the UE includes at least one of a power splitting EH circuit, an indication of a physical number of antennas, or a filter in a set of filters associated with the base station. Also, the DCI may include at least one of a data signal component or an EH signal component from another wireless device.

At 1040, UE 1002 may identify whether the DCI is energy harvesting (EH) SPS activation DCI, EH SPS reactivation DCI, data SPS activation DCI, data SPS reactivation DCI, or SPS release DCI, the EH SPS activation DCI and the EH SPS reactivation DCI corresponding to an EH configuration, the data SPS activation DCI and the data SPS reactivation DCI corresponding to a data processing configuration.

In some aspects, the identification of the DCI may include: identifying if a frequency domain resource assignment (FDRA) value of the DCI is a valid value or a non-valid value. If the FDRA value of the DCI is the valid value, the identification may further include: identifying if a redundancy version (RV) index of the DCI includes all '0' values. If the RV index of the DCI includes all '0' values, the DCI may be the data SPS activation DCI or the data SPS reactivation DCI. If the RV index of the DCI does not include all '0' values, the identification may further include: identifying if the RV index of the DCI includes a certain non-zero value. Also, if the RV index of the DCI includes the certain non-zero value, the DCI may be the EH SPS activation DCI or the EH SPS reactivation DCI; or if the RV index of the DCI does not include the certain non-zero value, the identification of the DCI may not be valid. In some instances, if the FDRA value of the DCI is the non-valid value, the identification may further include: identifying if a redundancy version (RV) index of the DCI includes all '0' values and a modulation and coding scheme (MCS) index of the DCI includes all '1' values. If the RV index of the DCI includes all '0' values and the MCS index of the DCI includes all '1' values, the DCI may be the SPS release DCI; or if the RV index of the DCI does not include all '0' values or the MCS index of the DCI does not include all '1' values, the identification of the DCI may not be valid.

In some instances, the identification of the DCI may include: identifying if a redundancy version (RV) index if the DCI includes all '0' values. If the RV index of the DCI includes all '0' values, the identification may further include: identifying if a frequency domain resource assignment (FDRA) value of the DCI is a valid value or a non-valid value. If the FDRA value of the DCI is the valid value, the DCI may be the data SPS activation DCI or the data SPS reactivation DCI. If the FDRA value of the DCI is the non-valid value, the identification may further include: identifying if a modulation and coding scheme (MCS) index of the DCI includes all '1' values. If the MCS index of the DCI includes all '1' values, the DCI may be the SPS release DCI; or if the MCS index of the DCI does not include all '1' values, the identification of the DCI may not be valid. In some aspects, if the MCS index of the DCI does not include all '1' values, the identification may further include: identifying if the MCS index of the DCI includes all '0' values. If the MCS index of the DCI includes all '0' values, the DCI may be the EH SPS activation DCI or the EH SPS reactivation DCI; or if the MCS index of the DCI does not include all '0' values, the identification of the DCI may not be valid. Additionally, if the RV index of the DCI does not include all '0' values, the identification may further include: identifying if a modulation and coding scheme (MCS) index of the DCI includes all '0' values. If the MCS index of the DCI includes all '0' values, the DCI may be the EH SPS activation DCI or the EH SPS reactivation DCI; or if the MCS index of the DCI does not include all '0' values, the identification of the DCI may not be valid.

At 1050, UE 1002 may configure an EH component associated with the EH configuration if the DCI is the EH SPS activation DCI or the EH SPS reactivation DCI, or performing data processing associated with the data processing configuration if the DCI is the data SPS activation DCI or the data SPS reactivation DCI.

At 1060, UE 1002 may perform energy harvesting via the EH component if the EH component is configured.

At 1070, UE 1002 may adjust a component path associated with energy harvesting if the EH component is configured, where the component path corresponds to at least one of: a number of antennas, a number of analog filters, a number of beams, or a number of ports.

Figure 11:
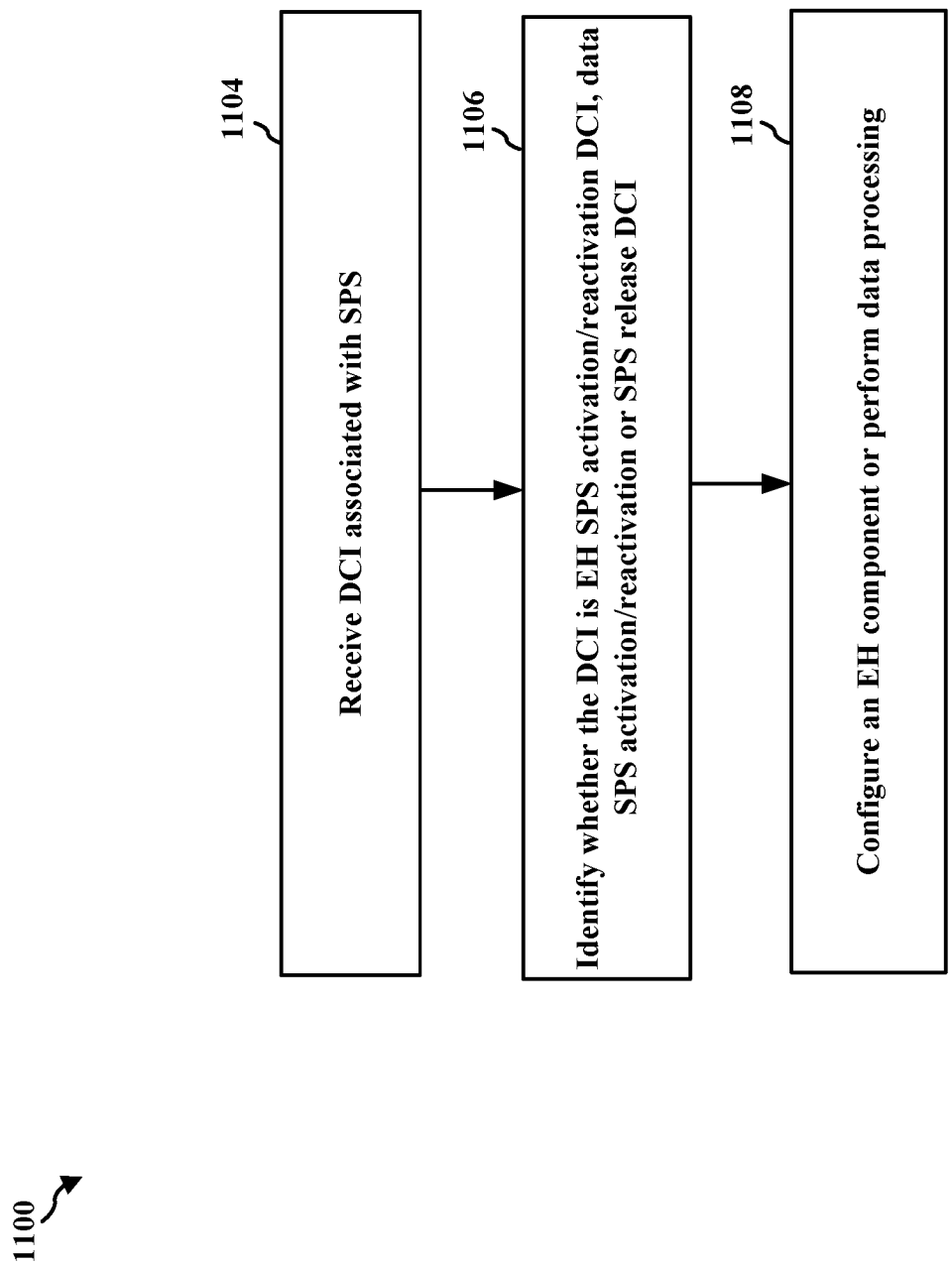
FIG. 11 is a flowchart of a method of wireless communication.

FIG. 11 is a flowchart 1100 of a method of wireless communication. The method may be performed by a UE or a component of a UE (e.g., the UE 104, 350, 1002; the apparatus 1402). The methods described herein may provide a number of benefits, such as improving communication signaling, resource utilization, and/or power savings.

At 1104, the UE may receive, from a base station, downlink control information (DCI) associated with semi-persistent scheduling (SPS), as described in connection with the examples in FIGS. 4-10. For example, UE 1002 may receive, from a base station, downlink control information (DCI) associated with semi-persistent scheduling (SPS), as described in connection with 1032 in FIG. 10. Further, 1104 may be performed by determination component 1440 in FIG. 14. The DCI may include at least one of a redundancy version (RV) index, a number of ports for energy harvesting, or a modulation and coding scheme (MCS) index. The RV index and/or the MCS index may correspond to one or more EH configuration parameters or a configuration of the EH component. The one or more EH configuration parameters may include a power splitting factor if the UE includes at least one of a power splitting EH circuit, an indication of a physical number of antennas, or a filter in a set of filters associated with the base station. Also, the DCI may include at least one of a data signal component or an EH signal component from another wireless device.

At 1106, the UE may identify whether the DCI is energy harvesting (EH) SPS activation DCI, EH SPS reactivation DCI, data SPS activation DCI, data SPS reactivation DCI, or SPS release DCI, the EH SPS activation DCI and the EH SPS reactivation DCI corresponding to an EH configuration, the data SPS activation DCI and the data SPS reactivation DCI corresponding to a data processing configuration, as described in connection with the examples in FIGS. 4-10. For example, UE 1002 may identify whether the DCI is energy harvesting (EH) SPS activation DCI, EH SPS reactivation DCI, data SPS activation DCI, data SPS reactivation DCI, or SPS release DCI, the EH SPS activation DCI and the EH SPS reactivation DCI corresponding to an EH configuration, the data SPS activation DCI and the data SPS reactivation DCI corresponding to a data processing configuration, as described in connection with 1040 in FIG. 10. Further, 1106 may be performed by determination component 1440 in FIG. 14.

In some aspects, the identification of the DCI may include: identifying if a frequency domain resource assignment (FDRA) value of the DCI is a valid value or a non-valid value. If the FDRA value of the DCI is the valid value, the identification may further include: identifying if a redundancy version (RV) index of the DCI includes all '0' values. If the RV index of the DCI includes all '0' values, the DCI may be the data SPS activation DCI or the data SPS reactivation DCI. If the RV index of the DCI does not include all '0' values, the identification may further include: identifying if the RV index of the DCI includes a certain non-zero value. Also, if the RV index of the DCI includes the certain non-zero value, the DCI may be the EH SPS activation DCI or the EH SPS reactivation DCI; or if the RV index of the DCI does not include the certain non-zero value, the identification of the DCI may not be valid. In some instances, if the FDRA value of the DCI is the non-valid value, the identification may further include: identifying if a redundancy version (RV) index of the DCI includes all '0' values and a modulation and coding scheme (MCS) index of the DCI includes all '1' values. If the RV index of the DCI includes all '0' values and the MCS index of the DCI includes all '1' values, the DCI may be the SPS release DCI; or if the RV index of the DCI does not include all '0' values or the MCS index of the DCI does not include all '1' values, the identification of the DCI may not be valid.

In some instances, the identification of the DCI may include: identifying if a redundancy version (RV) index if the DCI includes all '0' values. If the RV index of the DCI includes all '0' values, the identification may further include: identifying if a frequency domain resource assignment (FDRA) value of the DCI is a valid value or a non-valid value. If the FDRA value of the DCI is the valid value, the DCI may be the data SPS activation DCI or the data SPS reactivation DCI. If the FDRA value of the DCI is the non-valid value, the identification may further include: identifying if a modulation and coding scheme (MCS) index of the DCI includes all '1' values. If the MCS index of the DCI includes all '1' values, the DCI may be the SPS release DCI; or if the MCS index of the DCI does not include all '1' values, the identification of the DCI may not be valid. In some aspects, if the MCS index of the DCI does not include all '1' values, the identification may further include: identifying if the MCS index of the DCI includes all '0' values. If the MCS index of the DCI includes all '0' values, the DCI may be the EH SPS activation DCI or the EH SPS reactivation DCI; or if the MCS index of the DCI does not include all '0' values, the identification of the DCI may not be valid. Additionally, if the RV index of the DCI does not include all '0' values, the identification may further include: identifying if a modulation and coding scheme (MCS) index of the DCI includes all '0' values. If the MCS index of the DCI includes all '0' values, the DCI may be the EH SPS activation DCI or the EH SPS reactivation DCI; or if the MCS index of the DCI does not include all '0' values, the identification of the DCI may not be valid.

At 1108, the UE may configure an EH component associated with the EH configuration if the DCI is the EH SPS activation DCI or the EH SPS reactivation DCI, or performing data processing associated with the data processing configuration if the DCI is the data SPS activation DCI or the data SPS reactivation DCI, as described in connection with the examples in FIGS. 4-10. For example, UE 1002 may configure an EH component associated with the EH configuration if the DCI is the EH SPS activation DCI or the EH SPS reactivation DCI, or performing data processing associated with the data processing configuration if the DCI is the data SPS activation DCI or the data SPS reactivation DCI, as described in connection with 1050 in FIG. 10. Further, 1108 may be performed by determination component 1440 in FIG. 14.

Figure 12:
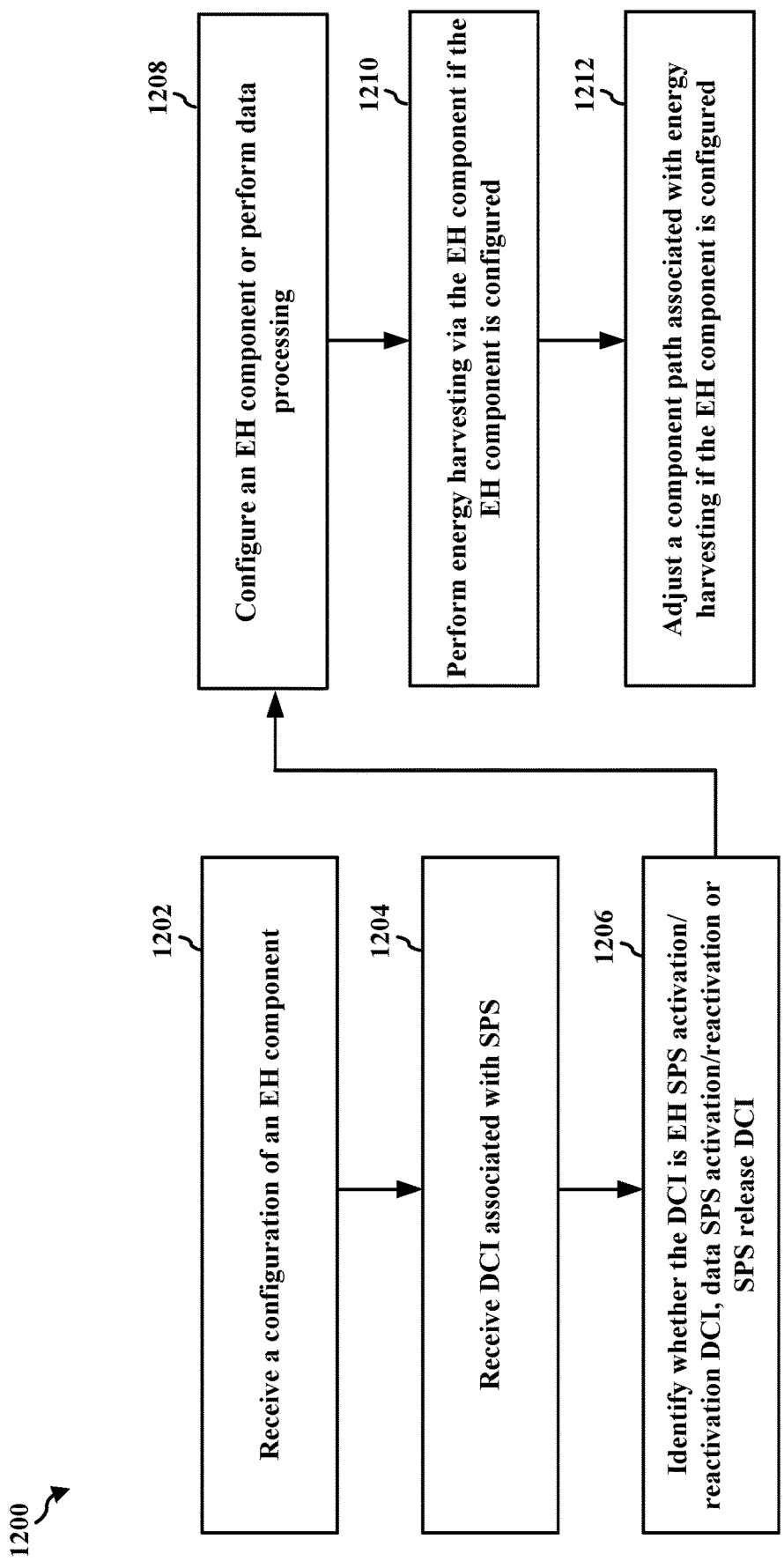
FIG. 12 is a flowchart of a method of wireless communication.

FIG. 12 is a flowchart 1200 of a method of wireless communication. The method may be performed by a UE or a component of a UE (e.g., the UE 104, 350, 1002; the apparatus 1402). The methods described herein may provide a number of benefits, such as improving communication signaling, resource utilization, and/or power savings.

At 1202, the UE may receive, from a base station, a configuration of an energy harvesting (EH) component via a radio resource control (RRC) message or a medium access control (MAC) control element (MAC-CE), as described in connection with the examples in FIGS. 4-10. For example, UE 1002 may receive, from a base station, a configuration of an energy harvesting (EH) component via a radio resource control (RRC) message or a medium access control (MAC) control element (MAC-CE), as described in connection with 1022 in FIG. 10. Further, 1202 may be performed by determination component 1440 in FIG. 14. In some instances, a configuration of the EH component may be preconfigured or pre-specified in a specification. Also, the EH component may be an EH circuit including at least one of a full switch, a partial switch, an EH filter, or an EH combiner.

At 1204, the UE may receive, from a base station, downlink control information (DCI) associated with semi-persistent scheduling (SPS), as described in connection with the examples in FIGS. 4-10. For example, UE 1002 may receive, from a base station, downlink control information (DCI) associated with semi-persistent scheduling (SPS), as described in connection with 1032 in FIG. 10. Further, 1204 may be performed by determination component 1440 in FIG. 14. The DCI may include at least one of a redundancy version (RV) index, a number of ports for energy harvesting, or a modulation and coding scheme (MCS) index. The RV index and/or the MCS index may correspond to one or more EH configuration parameters or a configuration of the EH component. The one or more EH configuration parameters may include a power splitting factor if the UE includes at least one of a power splitting EH circuit, an indication of a physical number of antennas, or a filter in a set of filters associated with the base station. Also, the DCI may include at least one of a data signal component or an EH signal component from another wireless device.

At 1206, the UE may identify whether the DCI is energy harvesting (EH) SPS activation DCI, EH SPS reactivation DCI, data SPS activation DCI, data SPS reactivation DCI, or SPS release DCI, the EH SPS activation DCI and the EH SPS reactivation DCI corresponding to an EH configuration, the data SPS activation DCI and the data SPS reactivation DCI corresponding to a data processing configuration, as described in connection with the examples in FIGS. 4-10. For example, UE 1002 may identify whether the DCI is energy harvesting (EH) SPS activation DCI, EH SPS reactivation DCI, data SPS activation DCI, data SPS reactivation DCI, or SPS release DCI, the EH SPS activation DCI and the EH SPS reactivation DCI corresponding to an EH configuration, the data SPS activation DCI and the data SPS reactivation DCI corresponding to a data processing configuration, as described in connection with 1040 in FIG. 10. Further, 1206 may be performed by determination component 1440 in FIG. 14.

In some aspects, the identification of the DCI may include: identifying if a frequency domain resource assignment (FDRA) value of the DCI is a valid value or a non-valid value. If the FDRA value of the DCI is the valid value, the identification may further include: identifying if a redundancy version (RV) index of the DCI includes all '0' values. If the RV index of the DCI includes all '0' values, the DCI may be the data SPS activation DCI or the data SPS reactivation DCI. If the RV index of the DCI does not include all '0' values, the identification may further include: identifying if the RV index of the DCI includes a certain non-zero value. Also, if the RV index of the DCI includes the certain non-zero value, the DCI may be the EH SPS activation DCI or the EH SPS reactivation DCI; or if the RV index of the DCI does not include the certain non-zero value, the identification of the DCI may not be valid. In some instances, if the FDRA value of the DCI is the non-valid value, the identification may further include: identifying if a redundancy version (RV) index of the DCI includes all '0' values and a modulation and coding scheme (MCS) index of the DCI includes all '1' values. If the RV index of the DCI includes all '0' values and the MCS index of the DCI includes all '1' values, the DCI may be the SPS release DCI; or if the RV index of the DCI does not include all '0' values or the MCS index of the DCI does not include all '1' values, the identification of the DCI may not be valid.

In some instances, the identification of the DCI may include: identifying if a redundancy version (RV) index if the DCI includes all '0' values. If the RV index of the DCI includes all '0' values, the identification may further include: identifying if a frequency domain resource assignment (FDRA) value of the DCI is a valid value or a non-valid value. If the FDRA value of the DCI is the valid value, the DCI may be the data SPS activation DCI or the data SPS reactivation DCI. If the FDRA value of the DCI is the non-valid value, the identification may further include: identifying if a modulation and coding scheme (MCS) index of the DCI includes all '1' values. If the MCS index of the DCI includes all '1' values, the DCI may be the SPS release DCI; or if the MCS index of the DCI does not include all '1' values, the identification of the DCI may not be valid. In some aspects, if the MCS index of the DCI does not include all '1' values, the identification may further include: identifying if the MCS index of the DCI includes all '0' values. If the MCS index of the DCI includes all '0' values, the DCI may be the EH SPS activation DCI or the EH SPS reactivation DCI; or if the MCS index of the DCI does not include all '0' values, the identification of the DCI may not be valid. Additionally, if the RV index of the DCI does not include all '0' values, the identification may further include: identifying if a modulation and coding scheme (MCS) index of the DCI includes all '0' values. If the MCS index of the DCI includes all '0' values, the DCI may be the EH SPS activation DCI or the EH SPS reactivation DCI; or if the MCS index of the DCI does not include all '0' values, the identification of the DCI may not be valid.

At 1208, the UE may configure an EH component associated with the EH configuration if the DCI is the EH SPS activation DCI or the EH SPS reactivation DCI, or performing data processing associated with the data processing configuration if the DCI is the data SPS activation DCI or the data SPS reactivation DCI, as described in connection with the examples in FIGS. 4-10. For example, UE 1002 may configure an EH component associated with the EH configuration if the DCI is the EH SPS activation DCI or the EH SPS reactivation DCI, or performing data processing associated with the data processing configuration if the DCI is the data SPS activation DCI or the data SPS reactivation DCI, as described in connection with 1050 in FIG. 10. Further, 1208 may be performed by determination component 1440 in FIG. 14.

At 1210, the UE may perform energy harvesting via the EH component if the EH component is configured, as described in connection with the examples in FIGS. 4-10. For example, UE 1002 may perform energy harvesting via the EH component if the EH component is configured, as described in connection with 1060 in FIG. 10. Further, 1210 may be performed by determination component 1440 in FIG. 14.

At 1212, the UE may adjust a component path associated with energy harvesting if the EH component is configured, where the component path corresponds to at least one of: a number of antennas, a number of analog filters, a number of beams, or a number of ports, as described in connection with the examples in FIGS. 4-10. For example, UE 1002 may adjust a component path associated with energy harvesting if the EH component is configured, where the component path corresponds to at least one of: a number of antennas, a number of analog filters, a number of beams, or a number of ports, as described in connection with 1070 in FIG. 10. Further, 1212 may be performed by determination component 1440 in FIG. 14.

Figure 13:
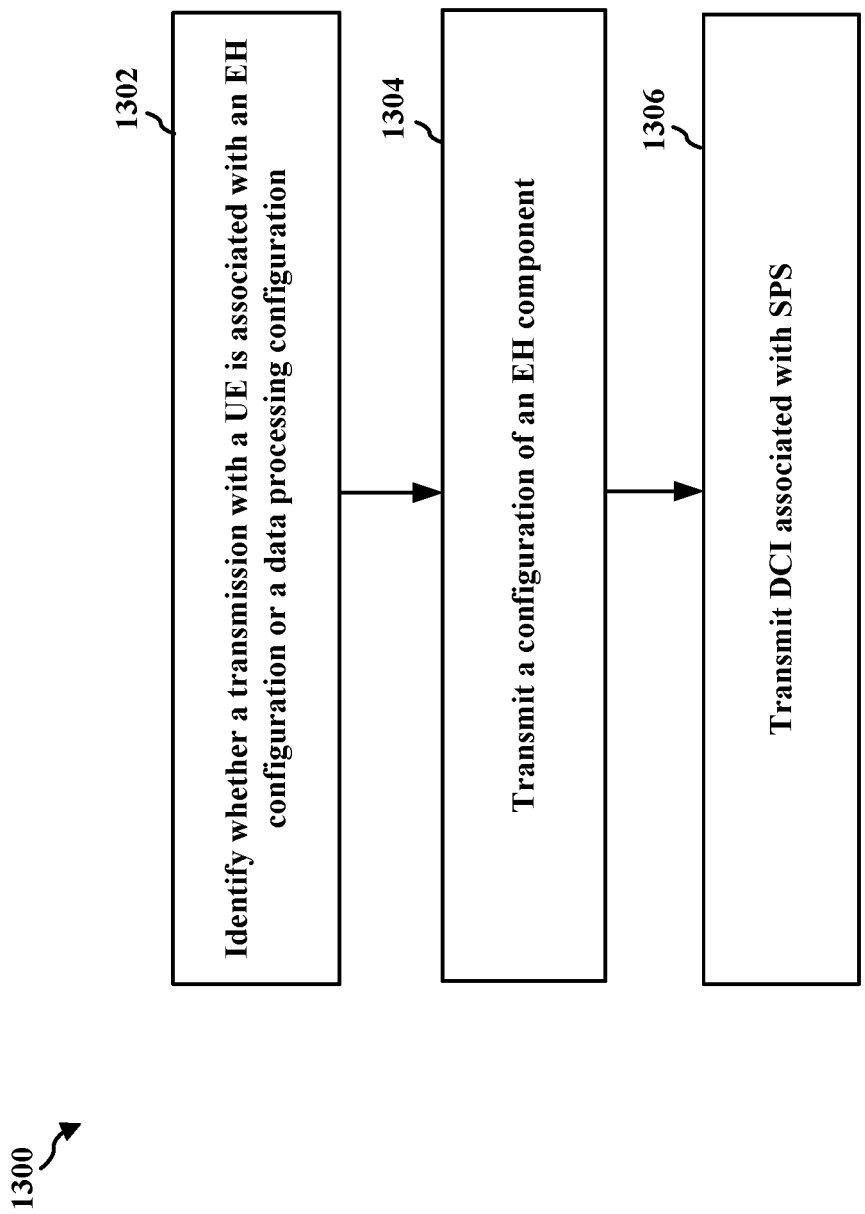
FIG. 13 is a flowchart of a method of wireless communication.

FIG. 13 is a flowchart 1300 of a method of wireless communication. The method may be performed by a base station or a component of a base station (e.g., the base station 102, 180, 310, 1004; the apparatus 1502). The methods described herein may provide a number of benefits, such as improving communication signaling, resource utilization, and/or power savings.

At 1302, the base station may identify whether a transmission with a user equipment (UE) is associated with an energy harvesting (EH) configuration or a data processing configuration, as described in connection with the examples in FIGS. 4-10. For example, base station 1004 may identify whether a transmission with a user equipment (UE) is associated with an energy harvesting (EH) configuration or a data processing configuration, as described in connection with 1010 in FIG. 10. Further, 1302 may be performed by determination component 1540 in FIG. 15.

At 1304, the base station may transmit, to the UE, a configuration of an EH component via a radio resource control (RRC) message or a medium access control (MAC) control element (MAC-CE), as described in connection with the examples in FIGS. 4-10. For example, base station 1004 may transmit, to the UE, a configuration of an EH component via a radio resource control (RRC) message or a medium access control (MAC) control element (MAC-CE), as described in connection with 1020 in FIG. 10. Further, 1304 may be performed by determination component 1540 in FIG. 15.

At 1306, the base station may transmit, to the UE, downlink control information (DCI) associated with semi-persistent scheduling (SPS), the DCI being EH SPS activation DCI, EH SPS reactivation DCI, data SPS activation DCI, data SPS reactivation DCI, or SPS release DCI, the EH SPS activation DCI and the EH SPS reactivation DCI corresponding to the EH configuration, the data SPS activation DCI and the data SPS reactivation DCI corresponding to the data processing configuration, as described in connection with the examples in FIGS. 4-10. For example, base station 1004 may transmit, to the UE, downlink control information (DCI) associated with semi-persistent scheduling (SPS), the DCI being EH SPS activation DCI, EH SPS reactivation DCI, data SPS activation DCI, data SPS reactivation DCI, or SPS release DCI, the EH SPS activation DCI and the EH SPS reactivation DCI corresponding to the EH configuration, the data SPS activation DCI and the data SPS reactivation DCI corresponding to the data processing configuration, as described in connection with 1030 in FIG. 10. Further, 1306 may be performed by determination component 1540 in FIG. 15.

In some aspects, the DCI may include at least one of a redundancy version (RV) index, a number of ports for energy harvesting, or a modulation and coding scheme (MCS) index. The RV index and/or the MCS index may correspond to one or more EH configuration parameters or a configuration of the EH component. The one or more EH configuration parameters may include a power splitting factor if the UE includes at least one of a power splitting EH circuit, an indication of a physical number of antennas, or a filter in a set of filters associated with the base station. The EH component may be an EH circuit including at least one of a full switch, a partial switch, an EH filter, or an EH combiner. Also, the DCI may include at least one of a data signal component or an EH signal component from another wireless device.

Figure 14:
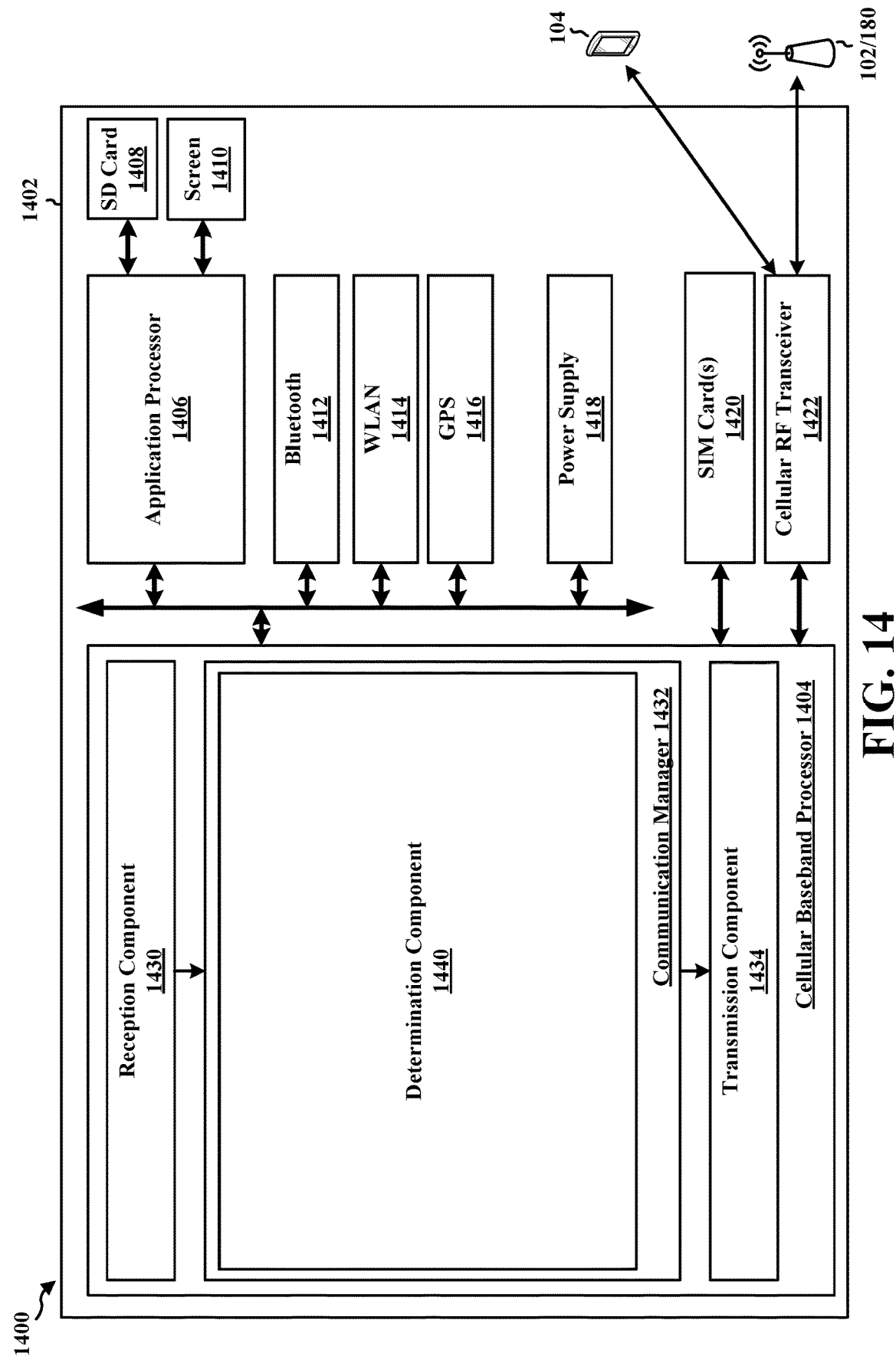
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a determination component 1440 that is configured to receive, from the base station, a configuration of an EH component via a radio resource control (RRC) message or a medium access control (MAC) control element (MAC-CE), e.g., as described in connection with step 1202 above. Determination component 1440 may also be configured to receive, from a base station, downlink control information (DCI) associated with semi-persistent scheduling (SPS), e.g., as described in connection with step 1204 above. Determination component 1440 may also be configured to identify whether the DCI is energy harvesting (EH) SPS activation DCI, EH SPS reactivation DCI, data SPS activation DCI, data SPS reactivation DCI, or SPS release DCI, the EH SPS activation DCI and the EH SPS reactivation DCI corresponding to an EH configuration, the data SPS activation DCI and the data SPS reactivation DCI corresponding to a data processing configuration, e.g., as described in connection with step 1206 above. Determination component 1440 may also be configured to configure an EH component associated with the EH configuration if the DCI is the EH SPS activation DCI or the EH SPS reactivation DCI, or performing data processing associated with the data processing configuration if the DCI is the data SPS activation DCI or the data SPS reactivation DCI, e.g., as described in connection with step 1208 above. Determination component 1440 may also be configured to perform energy harvesting via the EH component if the EH component is configured, e.g., as described in connection with step 1210 above. Determination component 1440 may also be configured to adjust a component path associated with energy harvesting if the EH component is configured, where the component path corresponds to at least one of: a number of antennas, a number of analog filters, a number of beams, or a number of ports, e.g., as described in connection with step 1212 above.

The apparatus may include additional components that perform each of the blocks of the algorithm in the flowcharts of FIGS. 10-12. As such, each block in the flowcharts of FIGS. 10-12 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for receiving, from the base station, a configuration of an EH component via a radio resource control (RRC) message or a medium access control (MAC) control element (MAC-CE); means for receiving, from a base station, downlink control information (DCI) associated with semi-persistent scheduling (SPS); means for identifying whether the DCI is energy harvesting (EH) SPS activation DCI, EH SPS reactivation DCI, data SPS activation DCI, data SPS reactivation DCI, or SPS release DCI, the EH SPS activation DCI and the EH SPS reactivation DCI corresponding to an EH configuration, the data SPS activation DCI and the data SPS reactivation DCI corresponding to a data processing configuration; means for configuring an EH component associated with the EH configuration if the DCI is the EH SPS activation DCI or the EH SPS reactivation DCI, or performing data processing associated with the data processing configuration if the DCI is the data SPS activation DCI or the data SPS reactivation DCI; means for performing energy harvesting via the EH component if the EH component is configured; and means for adjusting a component path associated with energy harvesting if the EH component is configured, where the component path corresponds to at least one of: a number of antennas, a number of analog filters, a number of beams, or a number of ports. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
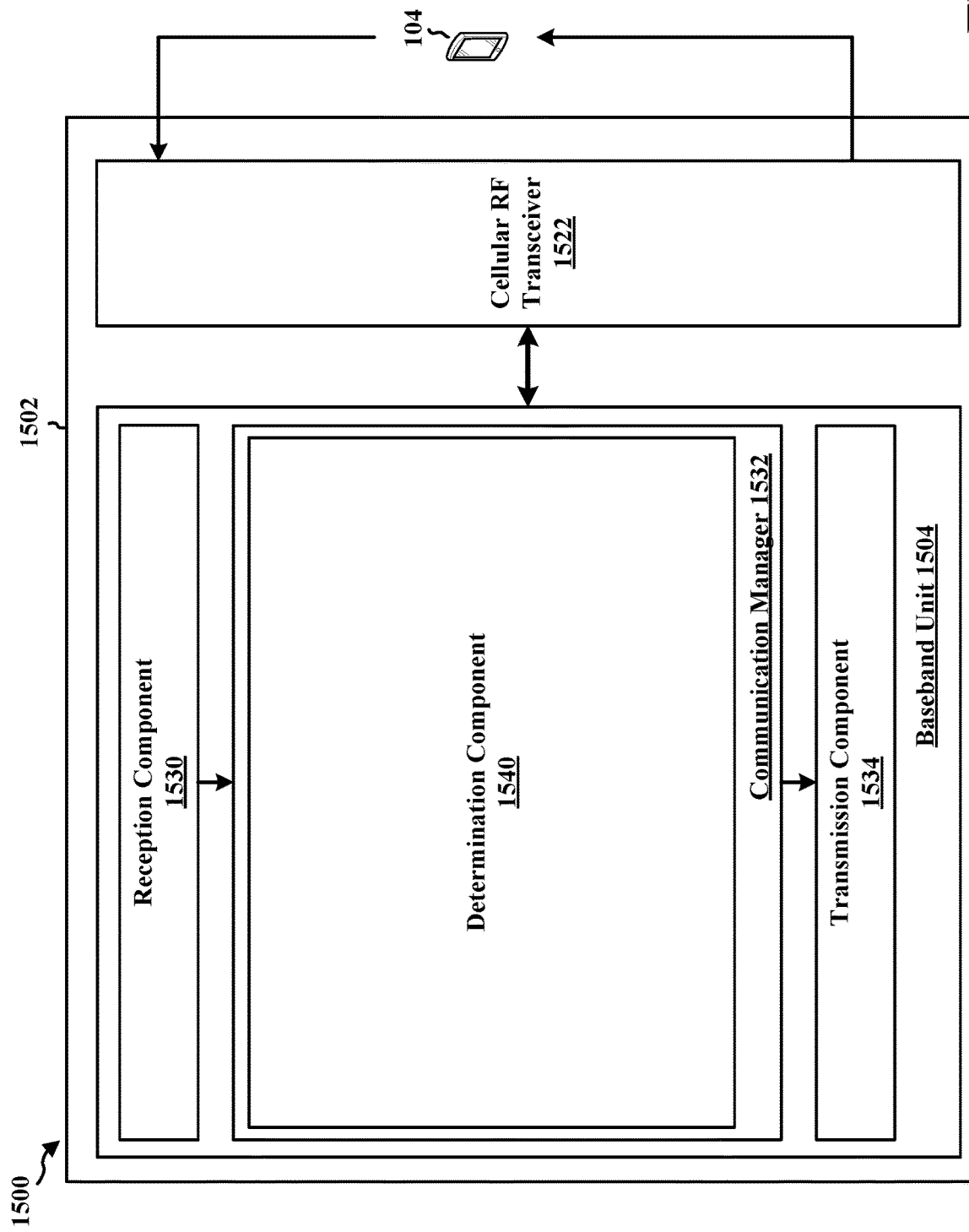
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/ processor 375.

The communication manager 1532 includes a determination component 1540 that is configured to identify whether a transmission with a user equipment (UE) is associated with an energy harvesting (EH) configuration or a data processing configuration, e.g., as described in connection with step 1302 above. Determination component 1540 may also be configured to transmit, to the UE, a configuration of an EH component via a radio resource control (RRC) message or a medium access control (MAC) control element (MAC-CE), e.g., as described in connection with step 1304 above. Determination component 1540 may also be configured to transmit, to the UE, downlink control information (DCI) associated with semi-persistent scheduling (SPS), the DCI being EH SPS activation DCI, EH SPS reactivation DCI, data SPS activation DCI, data SPS reactivation DCI, or SPS release DCI, the EH SPS activation DCI and the EH SPS reactivation DCI corresponding to the EH configuration, the data SPS activation DCI and the data SPS reactivation DCI corresponding to the data processing configuration, e.g., as described in connection with step 1306 above.

The apparatus may include additional components that perform each of the blocks of the algorithm in the flowcharts of FIGS. 10 and 13. As such, each block in the flowcharts of FIGS. 10 and 13 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for identifying whether a transmission with a user equipment (UE) is associated with an energy harvesting (EH) configuration or a data processing configuration; means for transmitting, to the UE, a configuration of an EH component via a radio resource control (RRC) message or a medium access control (MAC) control element (MAC-CE); and means for transmitting, to the UE, downlink control information (DCI) associated with semi-persistent scheduling (SPS), the DCI being EH SPS activation DCI, EH SPS reactivation DCI, data SPS activation DCI, data SPS reactivation DCI, or SPS release DCI, the EH SPS activation DCI and the EH SPS reactivation DCI corresponding to the EH configuration, the data SPS activation DCI and the data SPS reactivation DCI corresponding to the data processing configuration. The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to: receive, from a base station, downlink control information (DCI) associated with semi-persistent scheduling (SPS); identify whether the DCI is energy harvesting (EH) SPS activation DCI, EH SPS reactivation DCI, data SPS activation DCI, data SPS reactivation DCI, or SPS release DCI, the EH SPS activation DCI and the EH SPS reactivation DCI corresponding to an EH configuration, the data SPS activation DCI and the data SPS reactivation DCI corresponding to a data processing configuration; and configure an EH component associated with the EH configuration if the DCI is the EH SPS activation DCI or the EH SPS reactivation DCI, or performing data processing associated with the data processing configuration if the DCI is the data SPS activation DCI or the data SPS reactivation DCI.

Aspect 2 is the apparatus of aspect 1, where the DCI includes at least one of a redundancy version (RV) index, a number of ports for energy harvesting, or a modulation and coding scheme (MCS) index.

Aspect 3 is the apparatus of any of aspects 1 and 2, where the RV index or the MCS index corresponds to one or more EH configuration parameters or a configuration of the EH component.

Aspect 4 is the apparatus of any of aspects 1 to 3, where the one or more EH configuration parameters include a power splitting factor if the UE includes at least one of a power splitting EH circuit, an indication of a physical number of antennas, or a filter in a set of filters associated with the base station.

Aspect 5 is the apparatus of any of aspects 1 to 4, where the identification of the DCI includes: identifying if a frequency domain resource assignment (FDRA) value of the DCI is a valid value or a non-valid value.

Aspect 6 is the apparatus of any of aspects 1 to 5, where if the FDRA value of the DCI is the valid value, further including: identifying if a redundancy version (RV) index of the DCI includes all '0' values.

Aspect 7 is the apparatus of any of aspects 1 to 6, where if the RV index of the DCI includes all '0' values, the DCI is the data SPS activation DCI or the data SPS reactivation DCI.

Aspect 8 is the apparatus of any of aspects 1 to 7, where if the RV index of the DCI does not include all '0' values, further including: identifying if the RV index of the DCI includes a certain non-zero value.

Aspect 9 is the apparatus of any of aspects 1 to 8, where if the RV index of the DCI includes the certain non-zero value, the DCI is the EH SPS activation DCI or the EH SPS reactivation DCI; or where if the RV index of the DCI does not include the certain non-zero value, the identification of the DCI is not valid.

Aspect 10 is the apparatus of any of aspects 1 to 9, where if the FDRA value of the DCI is the non-valid value, further including: identifying if a redundancy version (RV) index of the DCI includes all '0' values and a modulation and coding scheme (MCS) index of the DCI includes all '1' values.

Aspect 11 is the apparatus of any of aspects 1 to 10, where if the RV index of the DCI includes all '0' values and the MCS index of the DCI includes all '1' values, the DCI is the SPS release DCI; or where if the RV index of the DCI does not include all '0' values or the MCS index of the DCI does not include all '1' values, the identification of the DCI is not valid.

Aspect 12 is the apparatus of any of aspects 1 to 11, where the identification of the DCI includes: identifying if a redundancy version (RV) index if the DCI includes all '0' values.

Aspect 13 is the apparatus of any of aspects 1 to 12, where if the RV index of the DCI includes all '0' values, further including: identifying if a frequency domain resource assignment (FDRA) value of the DCI is a valid value or a non-valid value.

Aspect 14 is the apparatus of any of aspects 1 to 13, where if the FDRA value of the DCI is the valid value, the DCI is the data SPS activation DCI or the data SPS reactivation DCI.

Aspect 15 is the apparatus of any of aspects 1 to 14, where if the FDRA value of the DCI is the non-valid value, further including: identifying if a modulation and coding scheme (MCS) index of the DCI includes all '1' values.

Aspect 16 is the apparatus of any of aspects 1 to 15, where if the MCS index of the DCI includes all '1' values, the DCI is the SPS release DCI; or where if the MCS index of the DCI does not include all '1' values, the identification of the DCI is not valid.

Aspect 17 is the apparatus of any of aspects 1 to 16, where if the MCS index of the DCI does not include all '1' values, further including: identifying if the MCS index of the DCI includes all '0' values.

Aspect 18 is the apparatus of any of aspects 1 to 17, where if the MCS index of the DCI includes all '0' values, the DCI is the EH SPS activation DCI or the EH SPS reactivation DCI; or where if the MCS index of the DCI does not include all '0' values, the identification of the DCI is not valid.

Aspect 19 is the apparatus of any of aspects 1 to 18, where if the RV index of the DCI does not include all '0' values, further including: identifying if a modulation and coding scheme (MCS) index of the DCI includes all '0' values.

Aspect 20 is the apparatus of any of aspects 1 to 19, where if the MCS index of the DCI includes all '0' values, the DCI is the EH SPS activation DCI or the EH SPS reactivation DCI; or where if the MCS index of the DCI does not include all '0' values, the identification of the DCI is not valid.

Aspect 21 is the apparatus of any of aspects 1 to 20, where the at least one processor is further configured to: perform energy harvesting via the EH component if the EH component is configured.

Aspect 22 is the apparatus of any of aspects 1 to 21, where the at least one processor is further configured to: adjust a component path associated with energy harvesting if the EH component is configured, where the component path corresponds to at least one of: a number of antennas, a number of analog filters, a number of beams, or a number of ports.

Aspect 23 is the apparatus of any of aspects 1 to 22, where the at least one processor is further configured to: receive, from the base station, a configuration of the EH component via a radio resource control (RRC) message or a medium access control (MAC) control element (MAC-CE).

Aspect 24 is the apparatus of any of aspects 1 to 23, where a configuration of the EH component is preconfigured or pre-specified in a specification.

Aspect 25 is the apparatus of any of aspects 1 to 24, where the EH component is an EH circuit including at least one of a full switch, a partial switch, an EH filter, or an EH combiner.

Aspect 26 is the apparatus of any of aspects 1 to 25, where the DCI includes at least one of a data signal component or an EH signal component from another wireless device.

Aspect 27 is the apparatus of any of aspects 1 to 26, further including a transceiver or an antenna coupled to the at least one processor.

Aspect 28 is a method of wireless communication for implementing any of aspects 1 to 27.

Aspect 29 is an apparatus for wireless communication including means for implementing any of aspects 1 to 27.

Aspect 30 is a computer-readable medium storing computer executable code, where the code when executed by a processor causes the processor to implement any of aspects 1 to 27.

Aspect 31 is an apparatus for wireless communication at a base station including at least one processor coupled to a memory and configured to: identify whether a transmission with a user equipment (UE) is associated with an energy harvesting (EH) configuration or a data processing configuration; transmit, to the UE, a configuration of an EH component via a radio resource control (RRC) message or a medium access control (MAC) control element (MAC-CE); and transmit, to the UE, downlink control information (DCI) associated with semi-persistent scheduling (SPS), the DCI being EH SPS activation DCI, EH SPS reactivation DCI, data SPS activation DCI, data SPS reactivation DCI, or SPS release DCI, the EH SPS activation DCI and the EH SPS reactivation DCI corresponding to the EH configuration, the data SPS activation DCI and the data SPS reactivation DCI corresponding to the data processing configuration.

Aspect 32 is the apparatus of aspect 31, where the DCI includes at least one of a redundancy version (RV) index, a number of ports for energy harvesting, or a modulation and coding scheme (MCS) index.

Aspect 33 is the apparatus of any of aspects 31 and 32, where the RV index or the MCS index corresponds to one or more EH configuration parameters or a configuration of the EH component.

Aspect 34 is the apparatus of any of aspects 31 to 33, where the one or more EH configuration parameters include a power splitting factor if the UE includes at least one of a power splitting EH circuit, an indication of a physical number of antennas, or a filter in a set of filters associated with the base station.

Aspect 35 is the apparatus of any of aspects 31 to 34, where the EH component is an EH circuit including at least one of a full switch, a partial switch, an EH filter, or an EH combiner.

Aspect 36 is the apparatus of any of aspects 31 to 35, where the DCI includes at least one of a data signal component or an EH signal component from another wireless device.

Aspect 37 is the apparatus of any of aspects 31 to 36, further including a transceiver or an antenna coupled to the at least one processor.

Aspect 38 is a method of wireless communication for implementing any of aspects 31 to 37.

Aspect 39 is an apparatus for wireless communication including means for implementing any of aspects 31 to 37.

Aspect 40 is a computer-readable medium storing computer executable code, where the code when executed by a processor causes the processor to implement any of aspects 31 to 37.

What is claimed is:

1. An apparatus for wireless communication at a user equipment (UE), comprising:
   a memory; and
   at least one processor coupled to the memory and configured to:
      receive, from a base station, downlink control information (DCI) associated with semi-persistent scheduling (SPS);
      identify whether the DCI is energy harvesting (EH) SPS activation DCI, EH SPS reactivation DCI, data SPS activation DCI, data SPS reactivation DCI, or SPS release DCI, the EH SPS activation DCI and the EH SPS reactivation DCI corresponding to an EH configuration, the data SPS activation DCI and the data SPS reactivation DCI corresponding to a data processing configuration, wherein the identification of the DCI comprises at least one of identifying if a frequency domain resource assignment (FDRA) value of the DCI is a valid value or a non-valid value or identifying if a redundancy version (RV) index of the DCI includes all '0' values; and
      configure an EH component associated with the EH configuration based on the EH SPS activation DCI or the EH SPS reactivation DCI, or perform data processing associated with the data processing configuration based on the data SPS activation DCI or the data SPS reactivation DCI.

2. The apparatus of claim 1, wherein the DCI includes at least one of the RV index, a number of ports for energy harvesting, or a modulation and coding scheme (MCS) index.

3. The apparatus of claim 2, wherein the RV index or the MCS index corresponds to one or more EH configuration parameters or a configuration of the EH component.

4. The apparatus of claim 3, wherein the one or more EH configuration parameters include a power splitting factor if the UE includes at least one of a power splitting EH circuit, an indication of a physical number of antennas, or a filter in a set of filters associated with the base station.

5. The apparatus of claim 1, wherein if the FDRA value of the DCI is the valid value, the at least one processor is further configured to: identify if the RV index of the DCI includes all '0' values.

6. The apparatus of claim 5, wherein if the RV index of the DCI includes all the '0' values, the DCI is the data SPS activation DCI or the data SPS reactivation DCI.

7. The apparatus of claim 5, wherein if the RV index of the DCI does not include all the '0' values, the at least one processor is further configured to: identify if the RV index of the DCI includes a certain non-zero value.

8. The apparatus of claim 7, wherein if the RV index of the DCI includes the certain non-zero value, the DCI is the EH SPS activation DCI or the EH SPS reactivation DCI; or
   wherein if the RV index of the DCI does not include the certain non-zero value, the identification of the DCI is not valid.

9. The apparatus of claim 1, wherein if the FDRA value of the DCI is the non-valid value, the at least one processor is further configured to: identify if the RV index of the DCI includes all '0' values and a modulation and coding scheme (MCS) index of the DCI includes all '1' values.

10. The apparatus of claim 9, wherein if the RV index of the DCI includes all the '0' values and the MCS index of the DCI includes all the '1' values, the DCI is the SPS release DCI; or
   wherein if the RV index of the DCI does not include all the '0' values or the MCS index of the DCI does not include all the '1' values, the identification of the DCI is not valid.

11. The apparatus of claim 1, wherein if the RV index of the DCI includes all the '0' values, the at least one processor is further configured to: identify if the FDRA value of the DCI is the valid value or the non-valid value.

12. The apparatus of claim 11, wherein if the FDRA value of the DCI is the valid value, the DCI is the data SPS activation DCI or the data SPS reactivation DCI.

13. The apparatus of claim 11, wherein if the FDRA value of the DCI is the non-valid value, the at least one processor is further configured to: identify if a modulation and coding scheme (MCS) index of the DCI includes all '1' values.

14. The apparatus of claim 13, wherein if the MCS index of the DCI includes all the '1' values, the DCI is the SPS release DCI; or
   wherein if the MCS index of the DCI does not include all the '1' values, the identification of the DCI is not valid.

15. The apparatus of claim 13, wherein if the MCS index of the DCI does not include all the '1' values, the at least one processor is further configured to: identify if the MCS index of the DCI includes all the '0' values.

16. The apparatus of claim 15, wherein if the MCS index of the DCI includes all the '0' values, the DCI is the EH SPS activation DCI or the EH SPS reactivation DCI; or
   wherein if the MCS index of the DCI does not include all the '0' values, the identification of the DCI is not valid.

17. The apparatus of claim 1, wherein if the RV index of the DCI does not include all the '0' values, the at least one processor is further configured to: identify if a modulation and coding scheme (MCS) index of the DCI includes all the '0' values.

18. The apparatus of claim 17, wherein if the MCS index of the DCI includes all the '0' values, the DCI is the EH SPS activation DCI or the EH SPS reactivation DCI; or
   wherein if the MCS index of the DCI does not include all the '0' values, the identification of the DCI is not valid.

19. The apparatus of claim 1, wherein the at least one processor is further configured to:
   perform energy harvesting via the EH component if the EH component is configured.

20. The apparatus of claim 1, wherein the at least one processor is further configured to:
   adjust a component path associated with energy harvesting if the EH component is configured, wherein the component path corresponds to at least one of: a number of antennas, a number of analog filters, a number of beams, or a number of ports.

21. The apparatus of claim 1, wherein the at least one processor is further configured to:
   receive, from the base station, a configuration of the EH component via a radio resource control (RRC) message or a medium access control (MAC) control element (MAC-CE).

22. The apparatus of claim 1, wherein a configuration of the EH component is preconfigured or pre-specified in a specification.

23. The apparatus of claim 1, further comprising a transceiver or an antenna coupled to the at least one processor,
   wherein the EH component is an EH circuit including at least one of a full switch, a partial switch, an EH filter, or an EH combiner,
   wherein the DCI includes at least one of a data signal component or an EH signal component from another wireless device.

24. A method of wireless communication at a user equipment (UE), comprising:
- receiving, from a base station, downlink control information (DCI) associated with semi-persistent scheduling (SPS);
- identifying whether the DCI is energy harvesting (EH) SPS activation DCI, EH SPS reactivation DCI, data SPS activation DCI, data SPS reactivation DCI, or SPS release DCI, the EH SPS activation DCI and the EH SPS reactivation DCI corresponding to an EH configuration, the data SPS activation DCI and the data SPS reactivation DCI corresponding to a data processing configuration, wherein the identification of the DCI comprises at least one of identifying if a frequency domain resource assignment (FDRA) value of the DCI is a valid value or a non-valid value or identifying if a redundancy version (RV) index of the DCI includes all '0' values; and
- configuring an EH component associated with the EH configuration based on the EH SPS activation DCI or the EH SPS reactivation DCI, or performing data processing associated with the data processing configuration based on the data SPS activation DCI or the data SPS reactivation DCI.

25. An apparatus for wireless communication at a base station, comprising:
- a memory; and
- at least one processor coupled to the memory and configured to:
  - identify whether a transmission with a user equipment (UE) is associated with an energy harvesting (EH) configuration or a data processing configuration;
  - transmit, to the UE, a configuration of an EH component via a radio resource control (RRC) message or a medium access control (MAC) control element (MAC-CE); and
  - transmit, to the UE, downlink control information (DCI) associated with semi-persistent scheduling (SPS), the DCI being EH SPS activation DCI, EH SPS reactivation DCI, data SPS activation DCI, data SPS reactivation DCI, or SPS release DCI, the EH SPS activation DCI and the EH SPS reactivation DCI corresponding to the EH configuration, the data SPS activation DCI and the data SPS reactivation DCI corresponding to the data processing configuration, wherein the DCI is identified as one of the EH SPS activation DCI, the EH SPS reactivation DCI, the data SPS activation DCI, the data SPS reactivation DCI, or the SPS release DCI based on at least one of whether a frequency domain resource assignment (FDRA) value of the DCI is a valid value or a non-valid value or whether a redundancy version (RV) index of the DCI includes all '0' values.

26. The apparatus of claim 25, wherein the DCI includes at least one of the RV index, a number of ports for energy harvesting, or a modulation and coding scheme (MCS) index,
- wherein the RV index or the MCS index corresponds to one or more EH configuration parameters or the configuration of the EH component,
- wherein the one or more EH configuration parameters include a power splitting factor if the UE includes at least one of a power splitting EH circuit, an indication of a physical number of antennas, or a filter in a set of filters associated with the base station.

27. The apparatus of claim 25, further comprising a transceiver or an antenna coupled to the at least one processor,
- wherein the EH component is an EH circuit including at least one of a full switch, a partial switch, an EH filter, or an EH combiner,
- wherein the DCI includes at least one of a data signal component or an EH signal component from another wireless device.

28. A method of wireless communication at a base station, comprising:
- identifying whether a transmission with a user equipment (UE) is associated with an energy harvesting (EH) configuration or a data processing configuration;
- transmitting, to the UE, a configuration of an EH component via a radio resource control (RRC) message or a medium access control (MAC) control element (MAC-CE); and
- transmitting, to the UE, downlink control information (DCI) associated with semi-persistent scheduling (SPS), the DCI being EH SPS activation DCI, EH SPS reactivation DCI, data SPS activation DCI, data SPS reactivation DCI, or SPS release DCI, the EH SPS activation DCI and the EH SPS reactivation DCI corresponding to the EH configuration, the data SPS activation DCI and the data SPS reactivation DCI corresponding to the data processing configuration, wherein the DCI is identified as one of the EH SPS activation DCI, the EH SPS reactivation DCI, the data SPS activation DCI, the data SPS reactivation DCI, or the SPS release DCI based on at least one of whether a frequency domain resource assignment (FDRA) value of the DCI is a valid value or a non-valid value or whether a redundancy version (RV) index of the DCI includes all '0' values.

* * * * *